(12) United States Patent
Wang et al.

(10) Patent No.: US 10,720,987 B2
(45) Date of Patent: Jul. 21, 2020

(54) HIGH-ALTITUDE COMMUNICATIONS SYSTEM, METHOD, AND APPARATUS

(71) Applicant: HUAWEI TECHNOLOGIES CO., LTD., Shenzhen, Guangdong (CN)

(72) Inventors: Kaiyao Wang, Beijing (CN); Yongjun Liu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/457,531

(22) Filed: Jun. 28, 2019

(65) Prior Publication Data

US 2019/0326983 A1 Oct. 24, 2019

Related U.S. Application Data

(63) Continuation of application No. PCT/CN2017/119109, filed on Dec. 27, 2017.

(30) Foreign Application Priority Data

Dec. 30, 2016 (CN) .......................... 2016 1 1265870

(51) Int. Cl.
*H04B 7/185* (2006.01)
*H04W 72/04* (2009.01)

(52) U.S. Cl.
CPC ..... *H04B 7/18519* (2013.01); *H04B 7/18502* (2013.01); *H04W 72/046* (2013.01)

(58) Field of Classification Search
CPC ............ H04B 7/18502; H04B 7/18504; H04B 7/2041; H04B 7/2606; H04B 7/18519; H04W 72/046
See application file for complete search history.

(56) References Cited

U.S. PATENT DOCUMENTS

2012/0200458 A1 8/2012 Jalali et al.
2014/0333491 A1 11/2014 Behroozi et al.
2016/0182140 A1 6/2016 Devaul et al.
(Continued)

FOREIGN PATENT DOCUMENTS

CN 102065032 A 5/2011
CN 103051373 A 4/2013
(Continued)

*Primary Examiner* — Dong-Chang Shiue
(74) *Attorney, Agent, or Firm* — Womble Bond Dickinson (US) LLP

(57) ABSTRACT

Embodiments of the present invention provide an air-ground communication control method. The method is applied to a hierarchical network that includes a ground network and at least one aerial network, and the method includes: receiving, by a ground platform, location information of a high-altitude platform sent by the high-altitude platform, where the ground platform is located in the ground network, the high-altitude platform is located in the aerial network, and a beam of the high-altitude platform covers the ground platform; determining a beam direction according to location information of the ground platform and the location information of the high-altitude platform; and sending beam width information to the high-altitude platform in the beam direction, where the beam width information is used to adjust an interval of sending the location information of the high-altitude platform.

40 Claims, 16 Drawing Sheets

(56) References Cited

U.S. PATENT DOCUMENTS

2016/0205560 A1    7/2016  Hyslop et al.
2016/0226573 A1*   8/2016  Behroozi ........... H04B 7/18504
2019/0229799 A1    7/2019  Behroozi

FOREIGN PATENT DOCUMENTS

| CN | 104170284 | A  | 11/2014 |
| CN | 104199030 | A  | 12/2014 |
| CN | 105453340 | A  |  3/2016 |
| CN | 105917595 | A  |  8/2016 |
| WO |   0180356 | A2 | 10/2001 |

* cited by examiner

US 10,720,987 B2

HIGH-ALTITUDE COMMUNICATIONS SYSTEM, METHOD, AND APPARATUS

CROSS-REFERENCE TO RELATED APPLICATIONS

This application is a continuation of International Application No. PCT/CN2017/119109, filed on Dec. 27, 2107, which claims priority to Chinese Patent Application No. 201611265870.7.7, filed on Dec. 30, 2016. The disclosures of the aforementioned applications are hereby incorporated by reference in their entireties.

TECHNICAL FIELD

Embodiments of the present invention relate to the field of wireless communications technologies, and in particular, to a high-altitude communications system, method, and apparatus.

BACKGROUND

According to a report of the International Telecommunication Union (ITU), currently, nearly two-thirds of the world's population still has no access to the Internet, and is mainly distributed in remote areas with a low population density. Network coverage on these areas by using ground base stations has very high costs. An aerial platform (a balloon, an airship, or a drone) is a new means to provide a wide coverage network for the remote areas. Generally, a high-altitude platform is located in the stratosphere at an altitude of 18 km to 25 km above the ground. The stratosphere generally has a relatively low wind speed (for example, a wind speed of 5 m/s to 40 m/s) and relatively small turbulence. In addition, an altitude higher than 18 km generally exceeds a maximum altitude specified for a commercial plane. Therefore, when deployed at an altitude of 18 km to 25 km, a high-altitude platform does not cause much interference to a commercial plane.

In a related technology such as Project Loon, a high-altitude platform carries a base station (including a communications device such as a BBU, an RRU, or an antenna) to rise to the stratosphere, and the high-altitude base station communicates with a ground core network through wireless backhaul. The high-altitude platform needs to take protection measures such as low temperature, low pressure, low humidity, and heat dissipation on the communications device, to prevent the device from being affected. The high-altitude platform is powered by solar cells.

During implementation of the present invention, the inventor finds that the prior art has at least the following problems:

Load of the high-altitude platform is directly proportional to a size and costs of the platform. Issues such as a volume, a weight, thermal insulation, heat dissipation, and power consumption of the base station moved to the high-altitude platform impose quite high requirements on a valid payload and a power supply capacity of the high-altitude platform. As a radio access network gradually evolves towards a C-RAN (cloud random access network) in the future, device power consumption, a volume, and a weight of a centralized baseband processing pool significantly increase compared with those of a conventional distributed base station. Consequently, the centralized baseband processing pool is difficult to carry to air by using a high-altitude platform. The existing structure requires exchange of an excessively large amount of information over an air interface between ground and air, leading to high power consumption.

SUMMARY

To resolve the problems in the prior art, embodiments of the present invention provide a high-altitude communications system, method, and apparatus. The technical solutions are as follows.

According to one aspect, an embodiment of the present invention provides an air-ground communication control method, where the method is applied to a hierarchical network that includes a ground network and at least one aerial network, and the method includes:

receiving, by a ground platform, location information of a high-altitude platform sent by the high-altitude platform, where the ground platform is located in the ground network, the high-altitude platform is located in the aerial network, and a beam of the high-altitude platform covers the ground platform;

determining a beam direction according to location information of the ground platform and the location information of the high-altitude platform; and sending beam width information to the high-altitude platform in the beam direction, where the beam width information is used to adjust an interval of sending the location information of the high-altitude platform.

In one embodiment, the method further includes:

measuring, by the ground platform, quality of a wireless fronthaul link, where the wireless fronthaul link is a wireless communication link between the ground platform and the high-altitude platform;

determining, according to the quality of the link, whether transmission interface switching needs to be performed on the wireless fronthaul link; and sending switching control information to the high-altitude platform when it is determined that switching needs to be performed, to control transmission interface switching to be performed on the wireless fronthaul link.

In one embodiment, the determining, according to the quality of the link and a predefined policy, whether switching needs to be performed on the wireless fronthaul link includes:

comparing, by the ground platform, the quality of the wireless fronthaul link with a threshold; and if the quality of the wireless fronthaul link is greater than the threshold, determining to perform wireless fronthaul communication with the high-altitude platform by using a wireless optical transmission interface; or if the quality of the wireless fronthaul link is less than the threshold, determining to perform wireless fronthaul communication with the high-altitude platform by using a radio transmission interface.

In one embodiment, the sending switching control information to the high-altitude platform when it is determined that switching needs to be performed, to control switching to be performed on the wireless fronthaul link includes:

when determining to perform wireless fronthaul communication with the high-altitude platform by using the wireless optical transmission interface, sending, by the ground platform, the switching control information to the high-altitude platform, to instruct the platform to perform wireless fronthaul communication by using the wireless optical transmission interface; or when determining to perform wireless fronthaul communication with the high-altitude platform by using the radio transmission interface, sending, by the ground platform, the switching control information to the high-altitude platform, to instruct the platform to perform wireless fronthaul communication by using the radio transmission interface.

In one embodiment, before the ground platform receives and stores the location information of the high-altitude platform sent by the high-altitude platform, the method further includes:

obtaining, by the ground platform, a maximum moving rate of the high-altitude platform;

calculating a boundary of a location range of the high-altitude platform according to the maximum moving rate; and controlling the high-altitude platform to move within the boundary of the location range.

In one embodiment, the obtaining, by the ground platform, a maximum moving rate of the high-altitude platform specifically includes:

obtaining coordinates of locations of the high-altitude platform at two different moments;

calculating an average rate in a time difference between the two different moments according to the time difference and a difference between the coordinates of the locations at the two different moments; and using, as the maximum moving rate, an average rate in a time difference that is in one or more flight cycles and in which an average rate value is largest.

In one embodiment, the calculating a boundary of a location range of the high-altitude platform according to the maximum moving rate is specifically:

calculating the boundary of the location range of the high-altitude platform according to the maximum moving rate, a distance between the ground platform and the high-altitude platform, a difference between a vertical elevation of the aerial network and a vertical elevation of the ground network, a maximum frequency offset allowed for the wireless fronthaul link, and a beam wavelength.

In one embodiment, the determining a beam direction according to location information of the ground platform and the location information of the high-altitude platform includes:

calculating a moving track of the high-altitude platform according to the location information of the high-altitude platform; and calculating the beam direction according to coordinates of a central location of the moving track and the location information of the ground platform.

In one embodiment, before the sending beam width information to the high-altitude platform in the beam direction, the method further includes:

calculating the moving track of the high-altitude platform according to the location information of the high-altitude platform; and calculating the beam width information according to the coordinates of the central location of the moving track and the location information of the ground platform, where the beam width information includes a horizontal lobe angle and a vertical lobe angle.

In one embodiment, the ground platform is a BBU (baseband unit or baseband processing unit) or a base station, and the high-altitude platform is an RRU (remote radio unit), a repeater, or an antenna.

According to another aspect, an embodiment of the present invention provides an air-ground communication control method, where the method is applied to a hierarchical network that includes a ground network and at least one aerial network, and the method includes:

periodically obtaining, by a high-altitude platform, location information and inclination angle information that are of the high-altitude platform;

controlling a beam direction according to the inclination angle information, and sending the location information of the high-altitude platform to a ground platform in the beam direction, where the ground platform is located in the ground network, the high-altitude platform is located in the aerial network, and a beam of the high-altitude platform covers the ground platform;

receiving beam width information sent by the ground platform, where the beam width information is calculated by the ground platform according to the location information and location information of the ground platform; and adjusting, according to the beam width information, an interval of sending the location information of the high-altitude platform.

In one embodiment, the method further includes:

after receiving a switching control command from the ground platform, switching to, according to information carried in the control command, a corresponding interface to perform wireless fronthaul communication.

According to another aspect, an embodiment of the present invention provides a ground platform, configured to control air-ground communication, and the ground platform is applied to a hierarchical network that includes a ground network and at least one aerial network, and the ground platform includes:

a receiving module, configured to receive location information of a high-altitude platform sent by the high-altitude platform, where the ground platform is located in the ground network, the high-altitude platform is located in the aerial network, and a beam of the high-altitude platform covers the ground platform;

a control module, configured to determine a beam direction according to location information of the ground platform and the location information that is received by the receiving module; and a sending module, configured to send beam width information to the high-altitude platform in the beam direction determined by the control module, where the beam width information is used to adjust an interval of sending the location information of the high-altitude platform.

In one embodiment, the platform further includes:

a measurement module, configured to measure quality of a wireless fronthaul link, where the wireless fronthaul link is a wireless communication link between the ground platform and the high-altitude platform;

a judging module, configured to determine, according to the quality of the link measured by the measurement module, whether transmission interface switching needs to be performed on the wireless fronthaul link; and a switching indication module, configured to send switching control information to the high-altitude platform when it is determined that switching needs to be performed, to control transmission interface switching to be performed on the wireless fronthaul link.

In one embodiment, the judging module includes:

a comparison unit, configured to compare the quality of the wireless fronthaul link measured by the measurement module with a threshold; and a judging unit, configured to: if a comparison result of the comparison unit is that the quality of the wireless fronthaul link is greater than the threshold, determine to perform wireless fronthaul communication with the high-altitude platform by using a wireless optical transmission interface; or if a comparison result of the comparison unit is that the quality of the wireless fronthaul link is less than the threshold, determine to perform wireless fronthaul communication with the high-altitude platform by using a radio transmission interface.

In one embodiment, the ground platform further includes:

a rate obtaining module, configured to obtain a maximum moving rate of the high-altitude platform;

a calculation module, configured to calculate a boundary of a location range of the high-altitude platform according to the maximum moving rate obtained by the rate obtaining module; and a movement control module, configured to control the high-altitude platform to move within the boundary that is of the location range and that is calculated by the calculation module.

In one embodiment, the rate obtaining module specifically includes:

a coordinates obtaining unit, configured to obtain coordinates of locations of the high-altitude platform at two different moments;

a calculation unit, configured to calculate an average rate in a time difference between the two different moments according to the time difference and a difference between the coordinates that are of the locations at the two different moments and that are obtained by the coordinates obtaining unit; and a rate determining unit, configured to use, as the maximum moving rate, an average rate, calculated by the calculation unit, in a time difference that is in one or more flight cycles and in which an average rate value is largest.

In one embodiment, the calculation module is specifically configured to:

calculate the boundary of the location range of the high-altitude platform according to the maximum moving rate, a distance between the ground platform and the high-altitude platform, a difference between a vertical elevation of the aerial network and a vertical elevation of the ground network, a maximum frequency offset allowed for the wireless fronthaul link, and a beam wavelength.

In one embodiment, the control module includes:

a track calculation unit, configured to calculate a moving track of the high-altitude platform according to the location information of the high-altitude platform; and a direction calculation unit, configured to calculate the beam direction according to coordinates of a central location of the moving track that are calculated by the track calculation unit and the location information of the ground platform.

In one embodiment, the ground platform further includes:

the track calculation unit, configured to calculate the moving track of the high-altitude platform according to the location information of the high-altitude platform; and a width information calculation unit, configured to calculate the beam width information according to the coordinates of the central location of the moving track that are calculated by the track calculation unit and the location information of the ground platform, where the beam width information includes a horizontal lobe angle and a vertical lobe angle.

In one embodiment, the ground platform is a BBU or a base station, and the high-altitude platform is an RRU, a repeater, or an antenna.

According to another aspect, an embodiment of the present invention provides a high-altitude platform, where the high-altitude platform is applied to a hierarchical network that includes a ground network and at least one aerial network, and the high-altitude platform includes:

an information obtaining module, configured to periodically obtain location information and inclination angle information that are of the high-altitude platform;

a beam direction control module, configured to control a beam direction according to the inclination angle information obtained by the information obtaining module;

a sending module, configured to send the location information of the high-altitude platform to a ground platform in the beam direction controlled by the beam direction control module, where the ground platform is located in the ground network, the high-altitude platform is located in the aerial network, and a beam of the high-altitude platform covers the ground platform;

a receiving module, configured to receive beam width information sent by the sending module, where the beam width information is calculated by the ground platform according to the location information and location information of the ground platform; and an adjusting module, configured to adjust, according to the beam width information received by the receiving module, an interval of sending the location information of the high-altitude platform.

In one embodiment, the receiving module is further configured to receive a switching control command from the ground platform, and the high-altitude platform further includes:

a switching module, configured to: after the receiving module receives the switching control command from the ground platform, switch to, according to information carried in the control command, a corresponding interface to perform wireless fronthaul communication.

An embodiment of the present invention provides a distributed high-altitude platform communications system, where the system includes a high-altitude lightweight front-end platform device and a ground heavyweight processing platform device;

the high-altitude lightweight front-end platform device includes the high-altitude platform according to the foregoing embodiment and an aerial device, where the aerial device carries the high-altitude platform to camp or move in air; and the ground heavyweight processing platform device includes the ground platform according to the foregoing embodiment and an antenna, where the antenna and the ground platform cooperate to send data.

In one embodiment, there are a plurality of high-altitude platforms and one ground platform, the high-altitude platforms and the ground platform form a star topology, and the plurality of high-altitude platforms separately perform wireless fronthaul communication with the ground platform.

In one embodiment, there are a plurality of high-altitude platforms whose quantity is the same as that of the ground platform, and each aerial platform uniquely corresponds to one ground platform for wireless fronthaul communication.

In one embodiment, there are a plurality of high-altitude platforms that form a chain topology, and there is one ground platform device, one high-altitude platform performs wireless fronthaul communication with the ground platform, and other high-altitude platforms communicate with the one high-altitude platform by using a trunk link.

In the technical solutions provided in the embodiments of the present invention, the high-altitude device and the ground device are separated, the beam direction is determined based on the location information of the high-altitude device or the location information of the ground device, and the beam width information is sent in the beam direction. The beam width information is used to adjust the interval of sending the location information of the high-altitude device, and a larger beam width indicated in the beam width information leads to a longer interval of sending the location information of the high-altitude device. In this way, an amount of information exchanged over an air interface between the ground device and the high-altitude device can be reduced, and the ground device does not need to adjust the beam direction in real time. This reduces power consumption of the ground device, and improves an antenna gain of the ground device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Example embodiments are described in detail herein, and examples of the example embodiments are presented in the accompanying drawings. When the following description is made with reference to the accompanying drawings, unless specified otherwise, same numbers in different accompanying drawings represent a same or similar element. Implementations described in the following example embodiments do not represent all implementations consistent with the present invention. On the contrary, they are only examples of apparatuses and methods that are described in the appended claims in detail and that are consistent with some aspects of the present invention.

Figure 11:
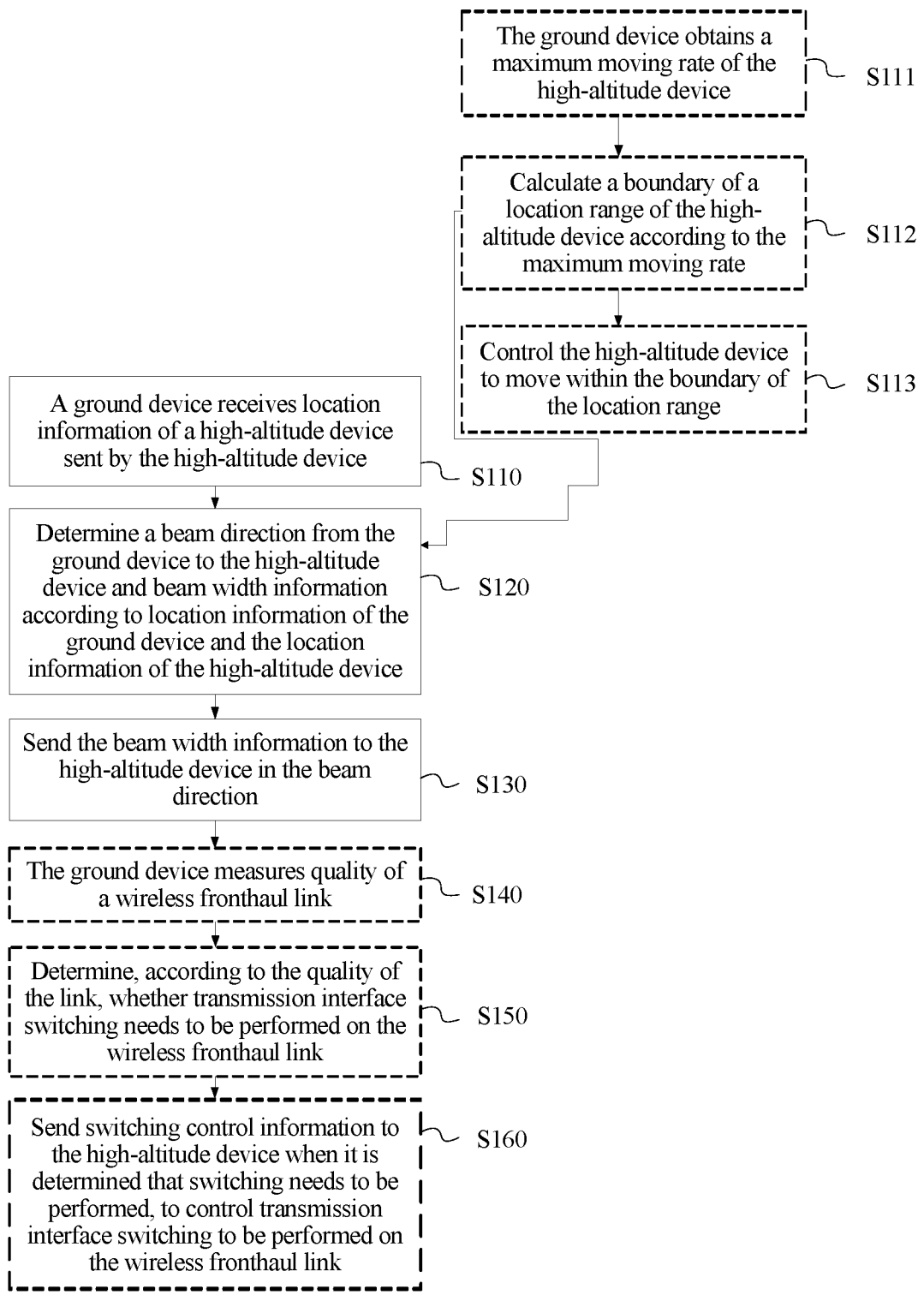
FIG. 11 is a flowchart of an air-ground communication control method according to an embodiment of the present invention.

As shown in FIG. 11, an embodiment of the present invention provides an air-ground communication control method. The method is applied to a hierarchical network that includes a ground network and at least one aerial network, and the method includes:

Block S110. A ground device receives location information of a high-altitude device sent by the high-altitude device, where the ground device is located in the ground network, the high-altitude device is located in the aerial network, and a beam of the high-altitude device covers the ground device.

Block S120. Determine a beam direction from the ground device to the high-altitude device and beam width information according to location information of the ground device and the location information of the high-altitude device.

Block S130. Send the beam width information to the high-altitude device in the beam direction, where the beam width information is used to adjust an interval of sending the location information of the high-altitude device.

As shown in dashed line boxes in FIG. 11, before block S120, the method further includes:

Block S111. The ground device obtains a maximum moving rate of the high-altitude device.

Block S112. Calculate a boundary of a location range of the high-altitude device according to the maximum moving rate.

Block S113. Control the high-altitude device to move within the boundary of the location range.

In one embodiment, block S111 includes:

obtaining location information of the high-altitude device at two different moments;

calculating an average rate in a time difference between the two different moments according to the location information at the two different moments; and using, as the maximum moving rate, an average rate in a time period that is in one or more flight cycles of the high-altitude device and in which an average rate value is largest.

In one embodiment, block S112 includes:

calculating the boundary of the location range of the high-altitude device according to the maximum moving rate, a maximum frequency offset allowed for a wireless link between the ground device and the high-altitude device, and a beam wavelength.

In one embodiment, block S120 of determining a beam direction to the high-altitude device and beam width information according to location information of the ground device and the location information of the high-altitude device includes:

Block S1201. Calculate coordinates of a central location of a moving track of the high-altitude device according to the location information of the high-altitude device.

Block S1202. Calculate the beam direction and the beam width information according to the coordinates of the central location of the moving track and the location information of the ground device.

Further, In one embodiment, block S1202 of calculating the beam direction and the beam width information according to the coordinates of the central location of the moving track and the location information of the ground device includes:

Block S12021. Calculate a distance between the ground device and the central location of the moving track according to the coordinates of the central location of the moving track and the location information of the ground device.

S12022. Calculate the beam direction according to the distance between the ground device and the central location of the moving track, the coordinates of the central location of the moving track, and the location information of the ground device.

Block S12023. Calculate a radius of the moving track according to the location information of the high-altitude device.

Block S12024. Calculate the beam width information according to the distance between the ground device and the central location of the moving track, a first preset value, the coordinates of the central location of the moving track, and the location information of the ground device, where the first preset value is greater than or equal to the radius of the moving track.

Optionally, in another embodiment, block S120 of determining a beam direction to the high-altitude device and beam width information according to location information of the ground device and the location information of the high-altitude device may include:

Block S121. Calculate a radius of the moving track according to the location information of the high-altitude device.

Block S122. Calculate a distance between the ground device and the high-altitude device according to the location information of the ground device and the location information of the high-altitude device.

Block S123. Calculate the beam direction according to the distance between the ground device and the high-altitude device, the location information of the high-altitude device, and the location information of the ground device.

Block S124. Calculate the beam width information according to the distance between the ground device and the high-altitude device, a second preset value, the location information of the high-altitude device, and the location information of the ground device, where the second preset value is greater than zero and less than or equal to the radius of the moving track.

In an embodiment, the ground device is a BBU, a base station, or a cloud baseband processing unit, the cloud baseband processing unit includes a plurality of BBUs, and the high-altitude device is an RRU, a repeater, or an antenna.

When the ground device is a BBU or a cloud baseband processing unit, the cloud baseband processing unit includes a plurality of BBUs, and the high-altitude device is an RRU, as shown in dashed line boxes in FIG. 11, the method further includes:

Block S140. The ground device measures quality of a wireless fronthaul link, where the wireless fronthaul link is a wireless communication link between the ground device and the high-altitude device.

Block S150. Determine, according to the quality of the link, whether transmission interface switching needs to be performed on the wireless fronthaul link.

Block S160. Send switching control information to the high-altitude device when it is determined that switching needs to be performed, to control transmission interface switching to be performed on the wireless fronthaul link.

In one embodiment, block S150 of determining, according to the quality of the link, whether switching needs to be performed on the wireless fronthaul link includes:

Block S151. The ground device compares the quality of the wireless fronthaul link with a threshold.

Block S152. If the quality of the wireless fronthaul link is greater than the threshold, determine to perform wireless fronthaul communication with the high-altitude device by using a wireless optical transmission interface; or if the quality of the wireless fronthaul link is less than the threshold, determine to perform wireless fronthaul communication with the high-altitude device by using a radio transmission interface.

In one embodiment, block S160 of sending switching control information to the high-altitude device when it is determined that switching needs to be performed, to control switching to be performed on the wireless fronthaul link includes:

Block S161. When determining to perform wireless fronthaul communication with the high-altitude device by using the wireless optical transmission interface, the ground device sends the switching control information to the high-altitude device, to instruct the high-altitude device to perform wireless fronthaul communication by using the wireless optical transmission interface.

Block S162. When determining to perform wireless fronthaul communication with the high-altitude device by using the radio transmission interface, the ground device sends the switching control information to the high-altitude device, to instruct the high-altitude device to perform wireless fronthaul communication by using the radio transmission interface.

Figure 12:
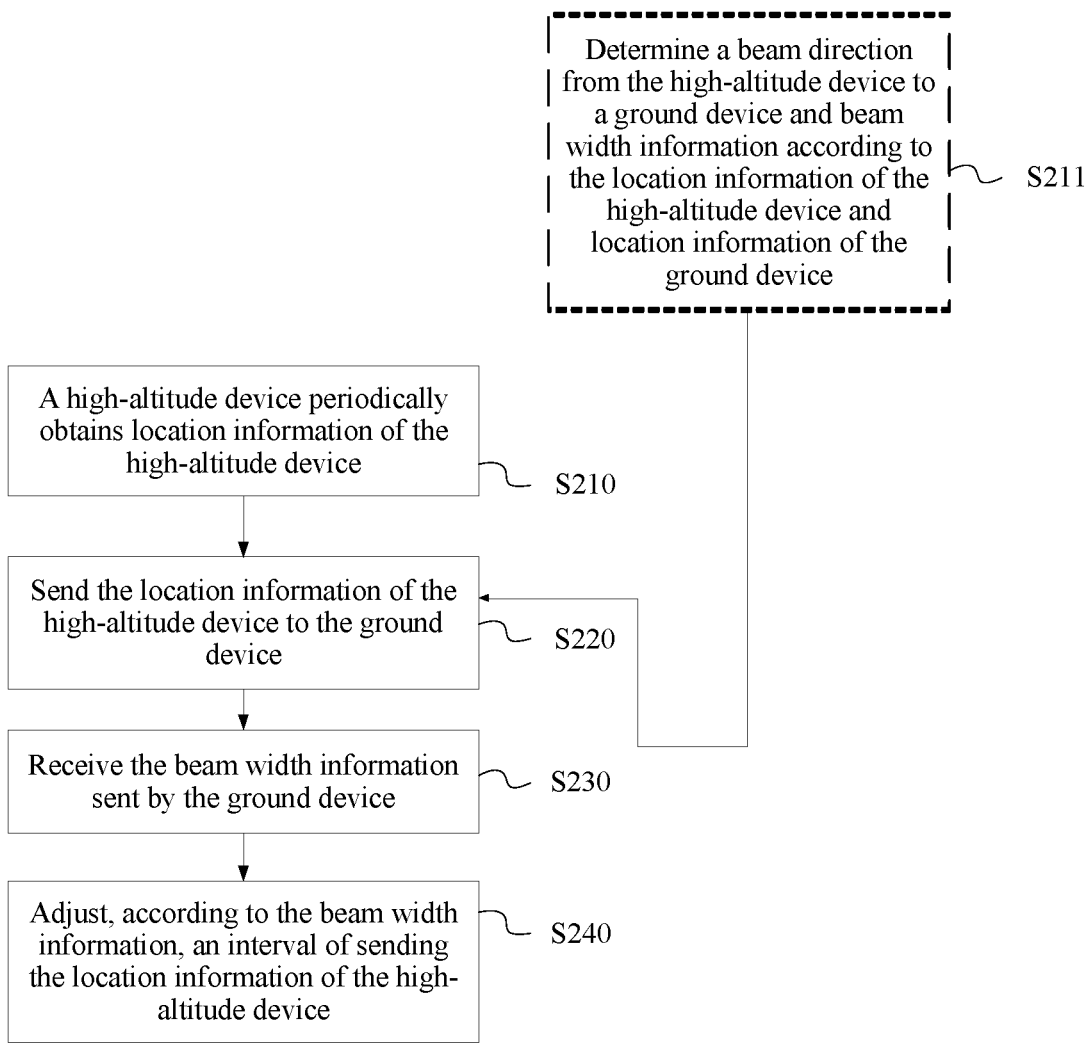
FIG. 12 is a flowchart of an air-ground communication control method according to an embodiment of the present invention.

As shown in FIG. 12, an embodiment of the present invention provides an air-ground communication control method. The method is applied to a hierarchical network that includes a ground network and at least one aerial network, and the method includes:

Block S210. A high-altitude device periodically obtains location information of the high-altitude device.

Block S220. Send the location information of the high-altitude device to a ground device, where the ground device is located in the ground network, the high-altitude device is located in the aerial network, and a beam of the high-altitude device covers the ground device.

Block S230. Receive beam width information sent by the ground device, where the beam width information is calculated by the ground device according to the received location information of the high-altitude device and location information of the ground device.

Block S240. Adjust, according to the beam width information, an interval of sending the location information of the high-altitude device, where a larger beam width indicated in the beam width information leads to a longer interval of sending the location information of the high-altitude device.

Optionally, as shown in a dashed line box in FIG. 12, in an embodiment, before block S220 of sending the location information of the high-altitude device to a ground device, the method further includes:

Block S211. Determine a beam direction from the high-altitude device to the ground device and beam width information according to the location information of the high-altitude device and location information of the ground device, where the location information of the ground device is preconfigured for the high-altitude device, and a beam width indicated in the beam width information covers at least the ground device.

Block S220 of sending the location information of the high-altitude device to a ground device includes:

sending the location information of the high-altitude device to the ground device in the beam direction.

In one embodiment, block S240 of determining a beam direction to the ground device and beam width information according to location information of the ground device and the location information of the high-altitude device includes:

Block S241. Calculate coordinates of a central location of a moving track of the high-altitude device according to the location information of the high-altitude device.

Block S242. Calculate the beam direction and the beam width information according to the coordinates of the central location of the moving track and the location information of the ground device.

Further, in one embodiment, block S242 includes:

Block S2421. Calculate a distance between the ground device and the central location of the moving track according to the coordinates of the central location of the moving track and the location information of the ground device.

Block S2422. Calculate the beam direction according to the distance between the ground device and the central location of the moving track, the coordinates of the central location of the moving track, and the location information of the ground device.

Block S2423. Calculate a radius of the moving track according to the location information of the high-altitude device.

Block S2424. Calculate the beam width information according to the distance between the ground device and the central location of the moving track, a first preset value, the coordinates of the central location of the moving track, and the location information of the ground device, where the first preset value is greater than or equal to the radius of the moving track.

In another embodiment, block S240 of determining a beam direction and beam width information according to location information of the ground device and the location information of the high-altitude device includes:

Block S2401. Calculate a radius of the moving track according to the location information of the high-altitude device.

Block S2402. Calculate a distance between the ground device and the high-altitude device according to the location information of the ground device and the location information of the high-altitude device.

Block S2403. Calculate the beam direction according to the distance between the ground device and the high-altitude device, the location information of the high-altitude device, and the location information of the ground device.

Block S2404. Calculate the beam width information according to the distance between the ground device and the high-altitude device, the second preset value, the location information of the high-altitude device, and the location information of the ground device, where the second preset value is greater than zero and less than or equal to the radius of the moving track.

In one embodiment, when the ground device is a BBU or a cloud baseband processing unit, the cloud baseband processing unit includes a plurality of BBUs, and the high-altitude device is an RRU, the method further includes:

Block S250. Receive a switching control command from the ground device, and switch to, according to information carried in the control command, a corresponding interface to perform wireless fronthaul communication.

In one embodiment, the high-altitude device and the ground device are separated, the beam direction is determined based on the location information of the high-altitude device or the location information of the ground device, and the beam width information is sent in the beam direction. The beam width information is used to adjust the interval of sending the location information of the high-altitude device, and a larger beam width indicated in the beam width information leads to a longer interval of sending the location information of the high-altitude device. In this way, an amount of information exchanged over an air interface between the ground device and the high-altitude device can be reduced, and the ground device does not need to adjust the beam direction in real time. This reduces power consumption of the ground device, and improves an antenna gain of the ground device.

The following further describes this embodiment of the present invention in detail with reference to a specific network scenario.

A radio access network (RAN) is an important asset for a mobile operator to live on, and can provide users with uninterrupted and high-quality data services 7×24 hours. A conventional radio access network has the following characteristics: 1. Each base station is connected to a fixed quantity of sector antennas and covers a small area, and each base station can process only signals received and sent in a cell the base station covers. 2. A system capacity is restricted by interference, and therefore spectral efficiency is difficult to increase when each base station works independently. These characteristics bring the following challenges: A large quantity of base stations mean high costs in construction investment, site facilities, site leasing and maintenance, and building more base stations means more capital expenses and operating expenses. In addition, actual utilization of an existing base station is still quite low, average load of a network is generally much lower than load during busy hours, and different base stations cannot share a processing capability. Therefore, spectral efficiency is difficult to increase.

A C-RAN is a cooperative wireless network that includes a cloud baseband processing unit, an RRU, and an antenna. The cloud baseband processing unit includes a plurality of BBUs. Essence of the C-RAN is to reduce a quantity of base station equipment rooms, reduce energy consumption, and use a cooperative virtualization technology to implement resource sharing and dynamic scheduling and improve spectral efficiency, so as to implement low-cost, high-bandwidth, and high-flexibility operation.

Because BBUs are centralized for processing, device power consumption, a volume, and a weight of the cloud baseband processing unit also increase significantly compared with those of a conventional distributed base station, and the cloud baseband processing unit is difficult to carry to air by using a high-altitude platform. In the present invention, a lightweight front-end device is carried to air by using a high-altitude platform, to implement effective combination with the C-RAN architecture.

A powered high-altitude platform (such as an airship or a drone) carries a lightweight front-end platform device to rise to air, to implement camping in air, that is, moving through flying within a specific range. The ground device includes a ground heavyweight processing platform device and an antenna, and the antenna is used for wireless communication between the ground heavyweight processing platform device and the lightweight front-end platform device.

The lightweight front-end platform device may be an RRU, a repeater, or a reflector antenna. The ground heavyweight processing platform device may be a BBU, a cloud baseband processing unit, or a base station.

In the technical solution provided in this embodiment of the present invention, the high-altitude device and the ground device are separated, the beam direction is determined based on the location information of the high-altitude device or the location information of the ground device, and the beam width information is sent in the beam direction. The beam width information is used to adjust the interval of sending the location information of the high-altitude device, and a larger beam width indicated in the beam width information leads to a longer interval of sending the location information of the high-altitude device. In this way, an amount of information exchanged over an air interface between the ground device and the high-altitude device can be reduced, and the ground device does not need to adjust the beam direction in real time. This reduces power consumption of the ground device, and improves an antenna gain of the ground device.

For ease of description, the following provides detailed description by using a high-altitude RRU and a ground BBU as an example.

Figure 1A:
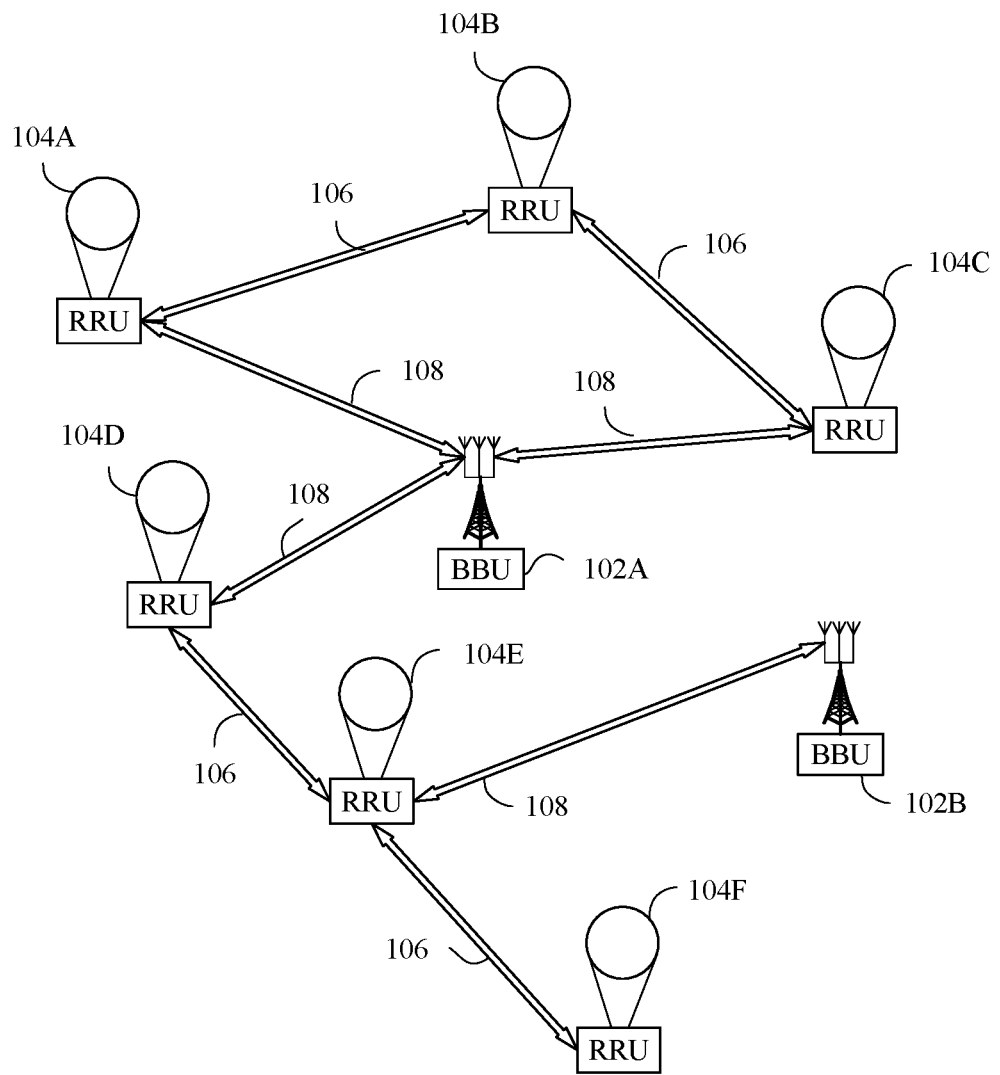
FIG. 1A is a schematic diagram of a distributed high-altitude platform communications system according to an embodiment of the present invention.

FIG. 1A is a schematic diagram of a distributed high-altitude platform communications system according to an embodiment of the present invention. As shown in FIG. 1A, the positioning system includes a plurality of BBUs (Base-Band Unit, baseband processing unit) 102A and 102B, and a plurality of RRUs (Remote Radio Unit, remote radio unit) 104A to 104F. The baseband processing units 102A and 102B are BBUs deployed on the ground, and are powered by a ground power supply system according to a configuration. The remote radio units 104A to 104F are high-altitude RRUs deployed in the stratosphere by using a high-altitude platform, and are powered by a high-altitude solar power system according to a configuration. More specifically, in the distributed high-altitude platform communications system, the high-altitude RRUs 104A to 104F may usually be configured to perform operations at an altitude of 18 km to 25 km (or at another altitude). This altitude range may be beneficial due to some reasons. Specifically, the stratosphere generally has a relatively low wind speed (for example, a wind speed of 5 m/s to 40 m/s) and relatively small turbulence. In addition, an altitude higher than 18 km generally exceeds a maximum altitude specified for a commercial plane. Therefore, when deployed at an altitude of 18 km to 25 km, a high-altitude platform does not cause much interference to a commercial plane.

In one embodiment of the present invention, the high-altitude RRUs 104A to 104F are configured to communicate with each other by using a free space link 106. Specifically, the free space link 106 includes at least one of a free space optical link and a microwave link. For example, the specified high-altitude RRUs 104A to 104F may send optical signals by using a laser, to communicate with other high-altitude RRUs 104A to 104F, and another type of free space optics communication is possible. For another example, the specified high-altitude RRUs 104A to 104F may send electromagnetic wave signals by using a millimeter wave, to communicate with other high-altitude RRUs 104A to 104F, and another type of microwave communication is possible. The specified high-altitude RRUs 104A to 104F may be configured to communicate with other high-altitude RRUs 104A to 104F by using a wireless CPRI protocol, a dedicated wireless fronthaul protocol developed for high altitude-to-high altitude, or the like.

In one embodiment of the present invention, the high-altitude RRUs 104A to 104F are configured to communicate with the ground BBUs 102A and 102B by using a free space link 108. Specifically, the free space link 108 includes at least one of a free space optical link and a microwave link. For example, the specified high-altitude RRUs 104A to 104F may send optical signals by using a laser, to communicate with the ground BBUs 102A and 102B, and another type of free space optics communication is possible. For another example, the specified high-altitude RRUs 104A to 104F may send electromagnetic wave signals by using a millimeter wave, to communicate with the ground BBUs 102A and 102B, and another type of microwave communication is possible. The specified high-altitude RRUs 104A to 104F may be configured to communicate with the ground BBUs 102A and 102B by using a wireless CPRI protocol, a dedicated wireless fronthaul protocol developed for high altitude-to-ground, or the like.

Figure 1B:
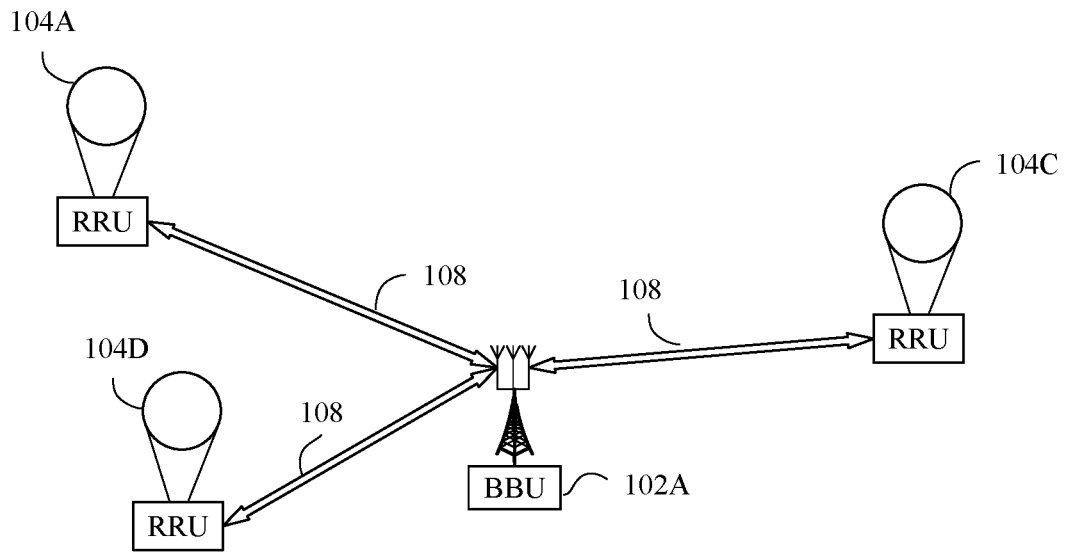
FIG. 1B is a schematic structural diagram of star networking according to an embodiment of the present invention.

In one embodiment of the present invention, the high-altitude RRUs 104A to 104F are configured to include at least one of the free space link 106 and the free space link 108. On one hand, there may be the following scenario: Some of the specified high-altitude RRUs 104A to 104F are configured to communicate with one of the specified ground BBUs 102A and 102B by using the free space link 108, thereby forming a star network structure, which is shown in FIG. 1B. For example, the high-altitude RRU 104A is configured to communicate with the ground BBU 102A by using the free space link 108, the high-altitude RRU 104C is configured to communicate with the ground BBU 102A by using the free space link 108, and the high-altitude RRU 104D is configured to communicate with the ground BBU 102A by using the free space link 108, and the high-altitude RRU 104A, the high-altitude RRU 104C, the high-altitude RRU 104D, and the ground BBU 102A form a star network structure.

Figure 1C:
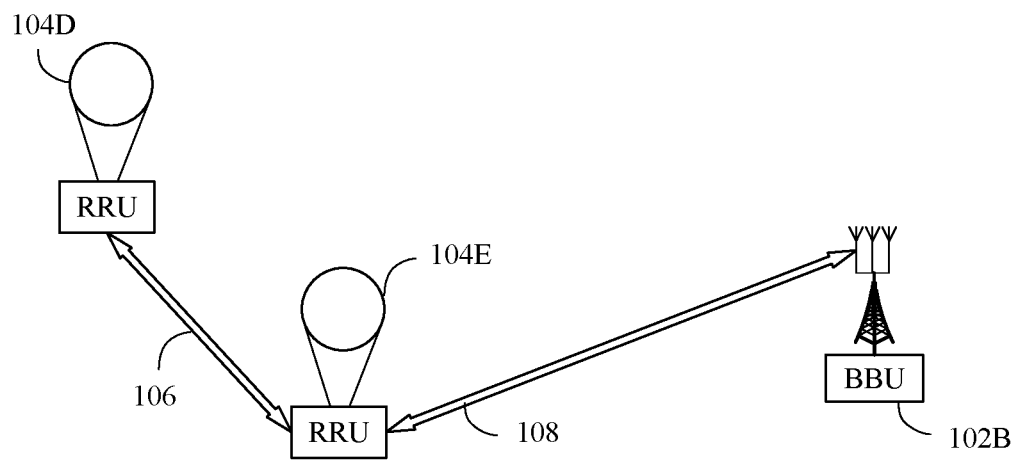
FIG. 1C is a schematic structural diagram of chain networking according to an embodiment of the present invention.
Figure 1D:
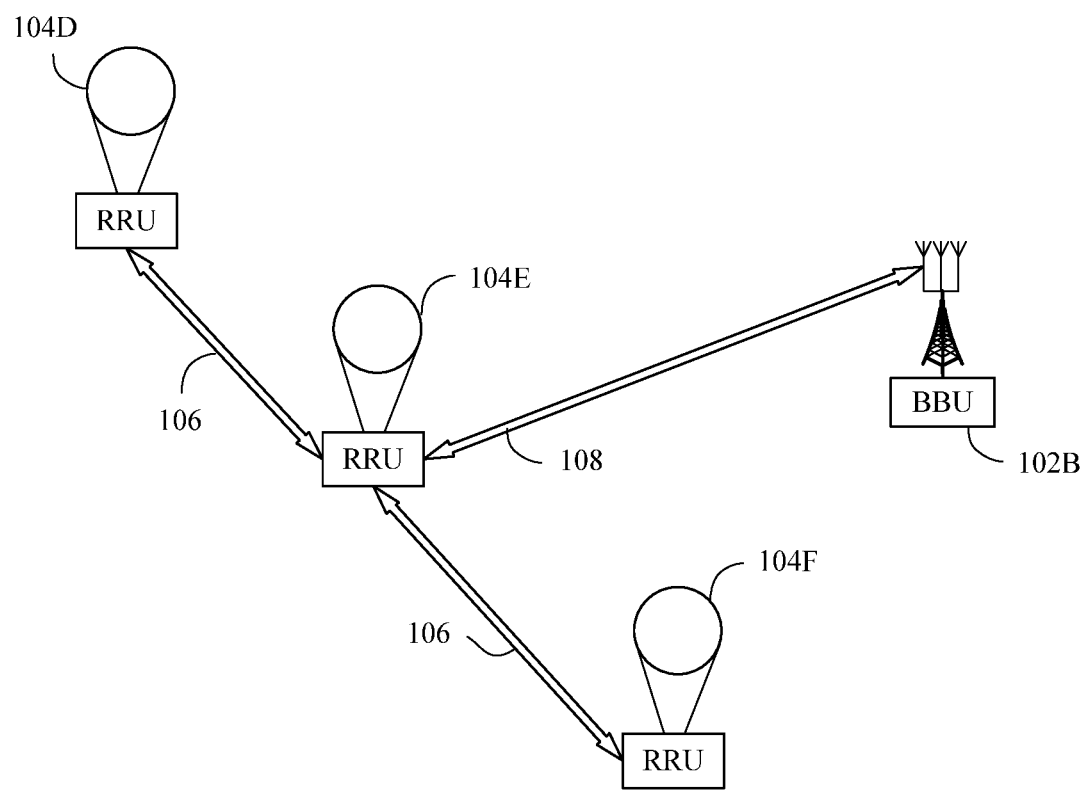
FIG. 1D is a schematic structural diagram of tree networking according to an embodiment of the present invention.

In one embodiment, one specified high-altitude RRU in the plurality of specified high-altitude RRUs 104A to 104F is configured to communicate with one of the specified ground BBUs 102A and 102B by using the free space link 108, and the plurality of specified high-altitude RRUs are configured to communicate with each other by using the free space link 106, thereby forming a chain network structure, which is shown in FIG. 1C. For example, the high-altitude RRU 104E is configured to communicate with the ground BBU 102B by using the free space link 108, and the high-altitude RRU 104D is configured to communicate with the high-altitude RRU 104E by using the free space link 106, and the high-altitude RRU 104D, the high-altitude RRU 104E, and the ground BBU 102B form a chain network structure. In addition, a tree network structure shown in FIG. 1D may be formed. For example, the high-altitude RRU 104E is configured to communicate with the ground BBU 102B by using the free space link 108, the high-altitude RRU 104D is configured to communicate with the high-altitude RRU 104E by using the free space link 106, and the high-altitude RRU 104F is configured to communicate with the high-altitude 104E by using the free space link 106, and the high-altitude RRU 104D, the high-altitude RRU 104E, the high-altitude RRU 104F, and the ground BBU 102B form a tree network structure.

Figure 1E:
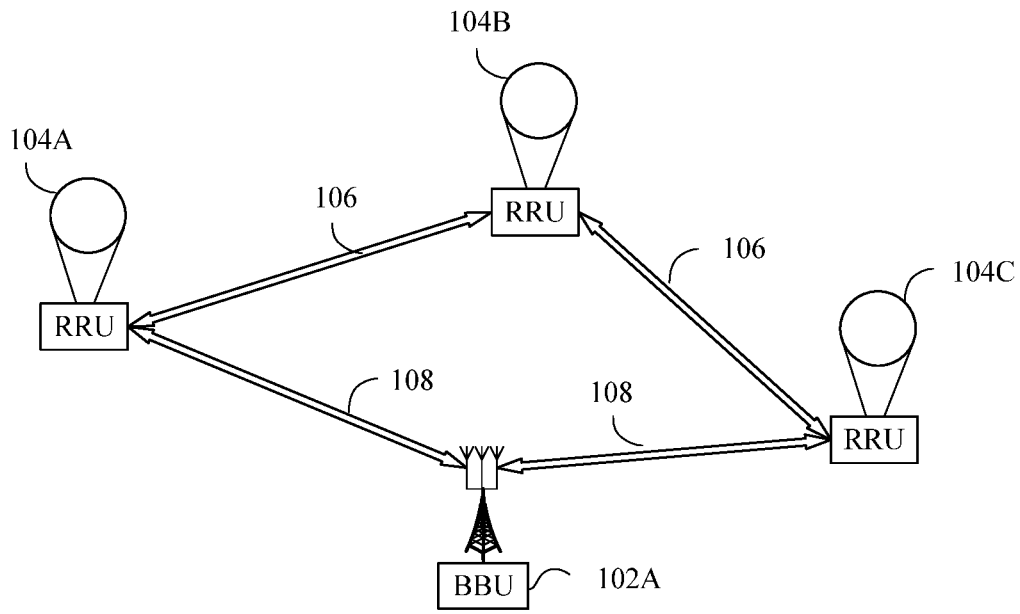
FIG. 1E is a schematic structural diagram of ring networking according to an embodiment of the present invention.

In one embodiment, two specified high-altitude RRUs in the plurality of specified high-altitude RRUs 104A to 104F are configured to communicate with one of the specified ground BBUs 102A and 102B by using the free space link 108, and the plurality of specified high-altitude RRUs are configured to communicate with each other by using the free space link 106, thereby forming a ring network structure, which is shown in FIG. 1E. For example, the high-altitude RRU 104A is configured to communicate with the ground BBU 102A by using the free space link 108, the high-altitude RRU 104C is configured to communicate with the ground BBU 102A by using the free space link 108, and the high-altitude RRU 104B is configured to communicate with the high-altitude RRU 104A and the high-altitude RRU 104C by using the free space link 106, and the high-altitude RRU 104AD, the high-altitude RRU 104B, the high-altitude RRU 104C, and the ground BBU 102A form a ring network structure.

Figure 2:
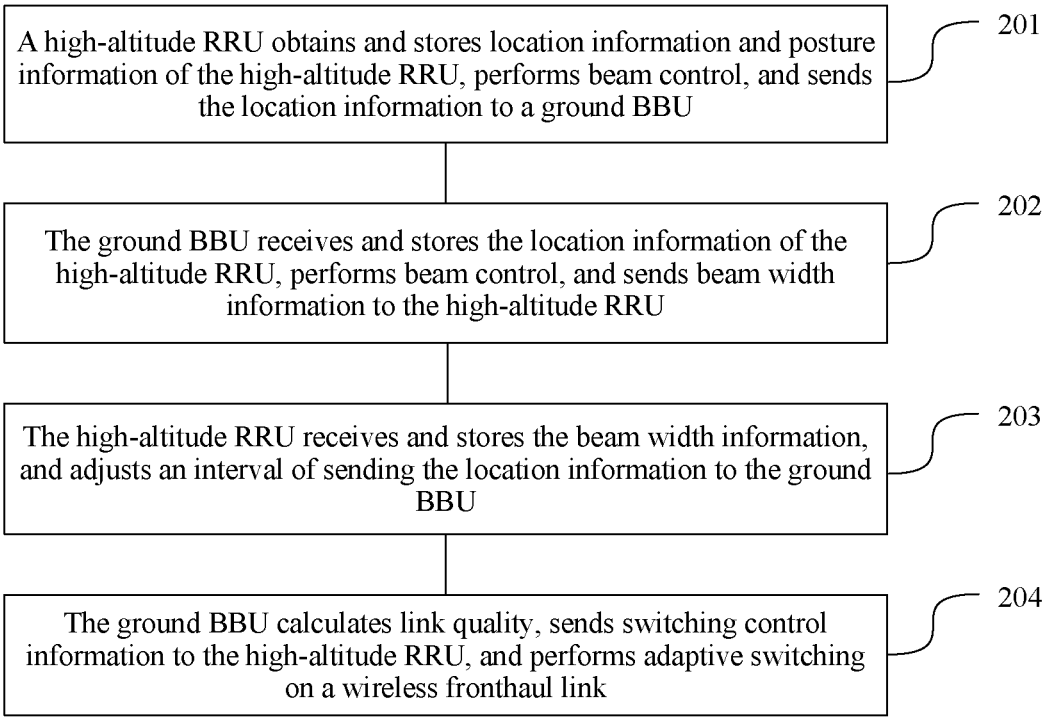
FIG. 2 is a flowchart of a communication method according to an embodiment of the present invention.

FIG. 2 is a flowchart of a communication method according to an embodiment of the present invention. Referring to FIG. 2, the method includes the following operations.

Block 201. A high-altitude RRU obtains and stores location information and posture information of the high-altitude RRU, performs beam control, and sends the location information to a ground BBU.

The high-altitude RRU is configured to periodically obtain the location information of the high-altitude RRU. Specifically, the location information is information about three-dimensional coordinates (x,y,z). A specific obtaining method is not limited in this embodiment of the present invention. The high-altitude RRU continuously moves, and roughly flies along a track with a radius R, instead of staying at a specific location. In one or more flight cycles, N(N≥3) pieces of location information is obtained, and the flight track is calculated. A method for obtaining the flight track may be:

calculating a central point $(x_0, y_0, z_0)$ of the flight track according to the following formula 1, where $(x_i, y_i, z_i)$ represents an $i^{th}$ piece of obtained location information, and · represents a multiplication operation;

$$\begin{cases} x_0 = \frac{1}{N} \cdot \sum_{i=1}^{N} x_i \\ y_0 = \frac{1}{N} \cdot \sum_{i=1}^{N} y_i \\ z_0 = \frac{1}{N} \cdot \sum_{i=1}^{N} z_i \end{cases} \quad (1)$$

and calculating the radius R of the flight track according to the following formula 2.

$$R = \frac{1}{N} \cdot \sum_{i=1}^{N} \sqrt[2]{(x_i - x_0)^2 + (y_i - y_0)^2 + (z_i - z_0)^2} \quad (2)$$

In one embodiment of the present invention, the ground BBU does not move, and location information $(x_b, y_b, z_b)$ is known to the high-altitude RRU and may be pre-stored in the high-altitude RRU.

Initial beam control performed by the high-altitude RRU on the ground BBU may include the following three cases.

A method in which the high-altitude RRU obtains a beam direction and a beam width according to a central point and a radius that are of a flight track, and the location information of the high-altitude RRU varies according to different expected beam direction control frequencies, and may specifically include the following two cases.

Figure 3A:
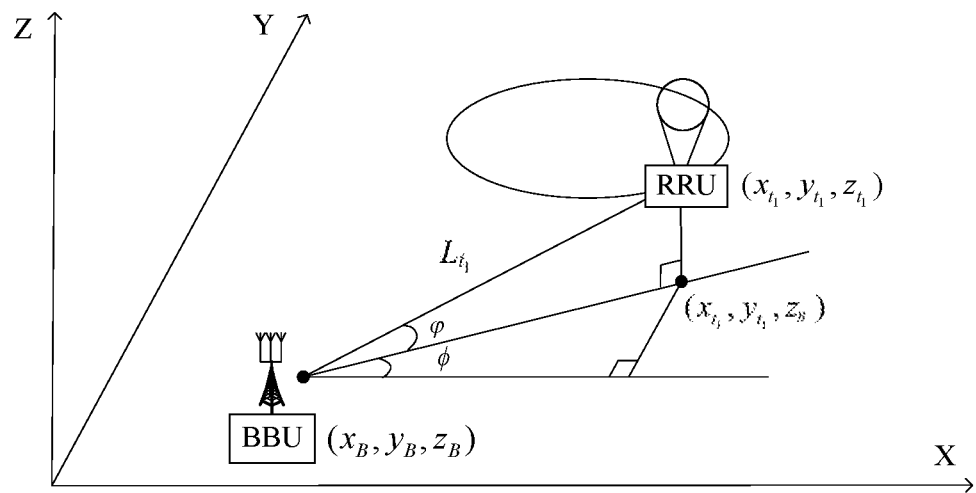
FIG. 3A is a schematic diagram of a beam direction obtaining method according to an embodiment of the present invention.

In a first case, when frequent beam direction control is expected, a beam coverage area may cover only the ground BBU, to obtain a higher antenna gain, but the high-altitude RRU needs to frequently send the location information. As shown in FIG. 3A, a method for obtaining the beam direction may be as follows.

At a moment $t_1$, a location of the high-altitude RRU is $(x_{t_1}, y_{t_1}, z_{t_1})$, and the high-altitude RRU may calculate a distance $L_{t_1}$ between the ground BBU and the high-altitude RRU according to the following formula 3, where $(x_B, y_B, z_B)$ is a location of the ground BBU.

$$L_{t_1} = \sqrt[2]{(x_B - x_{t_1})^2 + (y_B - y_{t_1})^2 + (z_B - z_{t_1})^2} \quad (3)$$

The beam direction is determined based on a horizontal azimuth $\phi$ and a vertical azimuth $\varphi$ of a beam. The high-altitude RRU may calculate the horizontal azimuth $\phi$ and the vertical azimuth $\varphi$ of the beam according to the following formula 4.

$$\begin{cases} \phi = \arctan\left(\frac{y_{t_1} - y_B}{x_{t_1} - x_B}\right) \\ \phi = \arcsin\left(\frac{z_{t_1} - z_B}{L_{t_1}}\right) \end{cases} \quad (4)$$

Figure 3B:
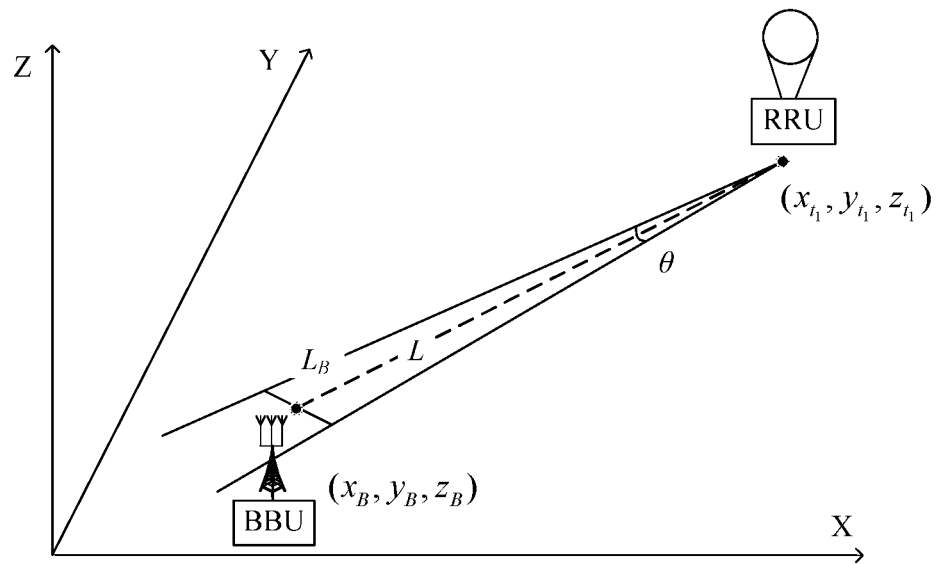
FIG. 3B is a schematic diagram of a method for obtaining a horizontal lobe angle of a beam according to an embodiment of the present invention.

In one embodiment of the present invention, after determining the beam direction, the high-altitude RRU calculates the beam width. The beam width is determined based on a horizontal lobe angle θ and a vertical lobe angle ψ. As shown in FIG. 3B, a method for obtaining a horizontal lobe angle of a beam may be as follows.

The high-altitude RRU may calculate the horizontal lobe angle θ of the beam according to the following formula 5.

$$\theta = 2 \cdot \arctan\left(\frac{L_2}{L_1}\right) \quad (5)$$

$L_2$ is a second preset value ($0 < L_2 \leq R$, and R is the radius of the flight track). It should be noted that the ground BBU device includes an antenna system, and $L_2$ may be a size of the ground BBU, or may be a size of the antenna system, or may be a value greater than the size of the ground BBU.

Figure 3C:
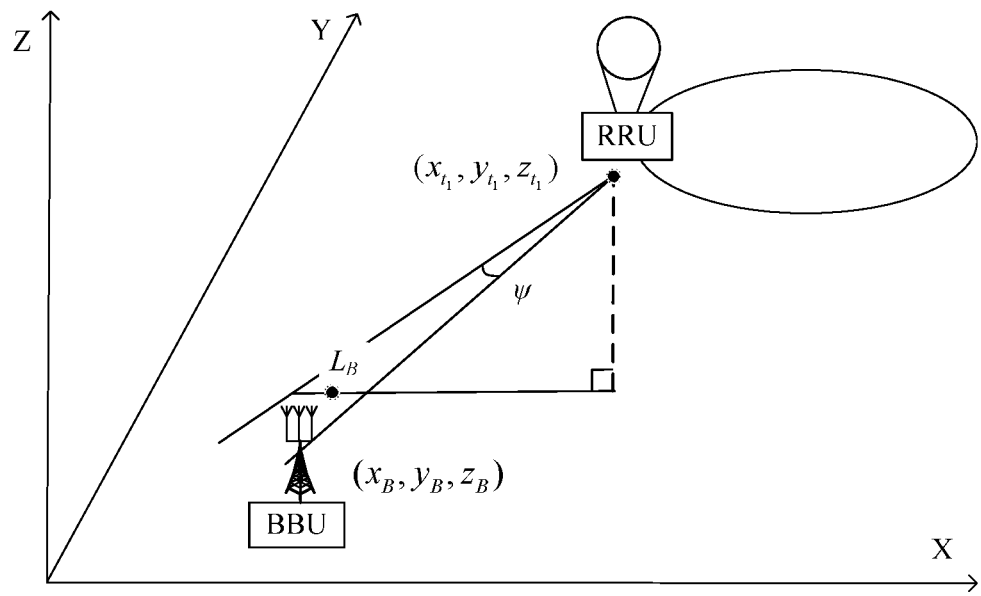
FIG. 3C is a schematic diagram of a method for obtaining a vertical lobe angle of a beam according to an embodiment of the present invention.

As shown in FIG. 3C, a method for obtaining a vertical lobe angle of a beam may be as follows.

It should be noted that a value of the vertical lobe angle ψ of the beam varies according to different locations of the high-altitude RRU.

The high-altitude RRU may calculate the vertical lobe angle ψ of the beam according to the following formula 6.

$$\psi_{t_1} = \arctan\left(\frac{\sqrt[2]{(x_B - x_{t_1})^2 + (y_B - y_{t_1})^2} + L_2}{z_{t_1} - z_B}\right) - \arctan\left(\frac{\sqrt[2]{(x_B - x_{t_1})^2 + (y_B - y_{t_1})^2} - L_2}{z_{t_1} - z_B}\right) \quad (6)$$

Figure 3D:
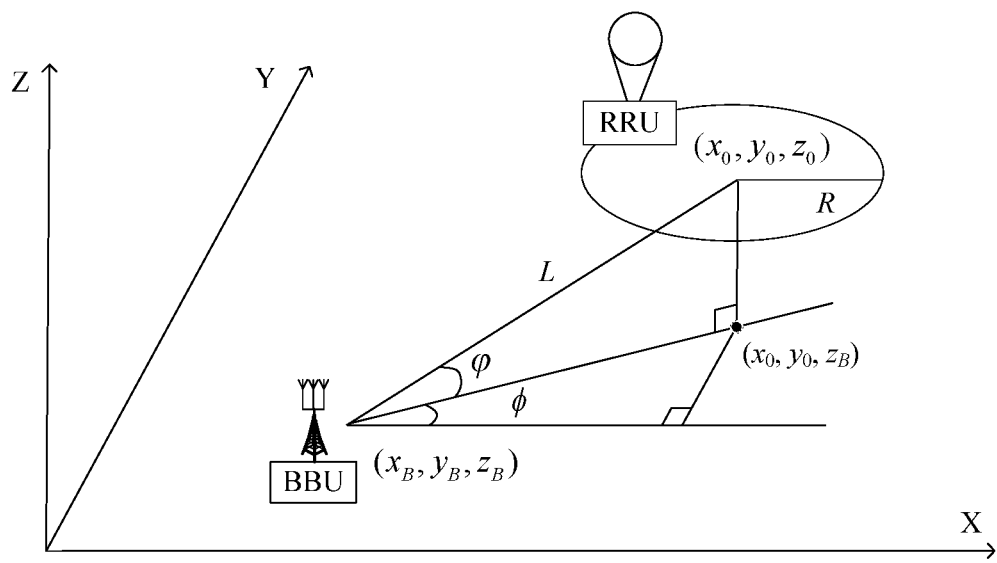
FIG. 3D is a schematic diagram of another beam direction obtaining method according to an embodiment of the present invention.
Figure 3E:
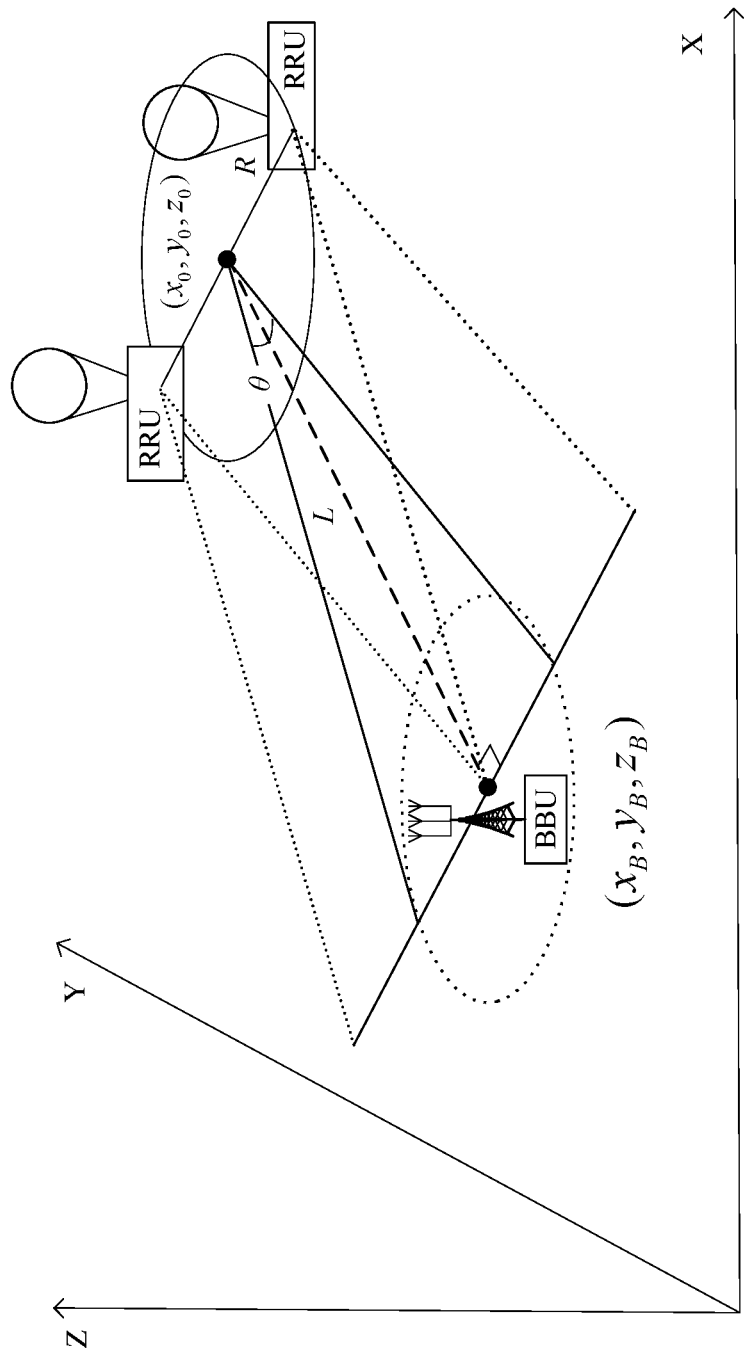
FIG. 3E is a schematic diagram of another method for obtaining a horizontal lobe angle of a beam according to an embodiment of the present invention.
Figure 3F:
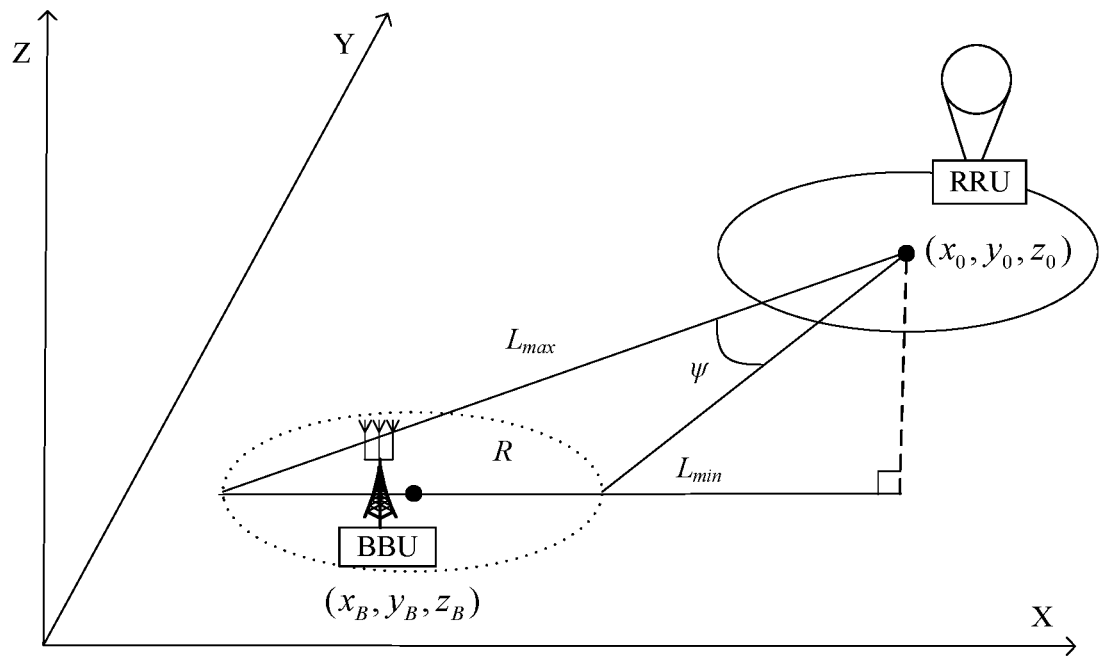
FIG. 3F is a schematic diagram of another method for obtaining a vertical lobe angle of a beam according to an embodiment of the present invention.

In a second case, when expecting infrequent beam direction control, the high-altitude RRU requires that the beam width may include a flight range of the high-altitude RRU, so that the high-altitude RRU does not need to adjust the beam direction or the beam width at any point on the flight track. The high-altitude RRU can avoid frequent beam direction control and reduce power consumption of the high-altitude RRU, but an antenna gain is reduced. As shown in FIG. 3D, a method for obtaining the beam direction may be as follows.

The high-altitude RRU may calculate a distance L between the ground BBU and the central point of the flight track according to the following formula 7, where $(x_B, y_B, z_B)$ is a location of the ground BBU, and $(x_0, y_0, z_0)$ is a location of the central point of the flight track.

$$L = \sqrt[2]{(x_B - x_0)^2 + (y_B - y_0)^2 + (z_B - z_0)^2} \quad (7)$$

The beam direction is determined based on a horizontal azimuth φ and a vertical azimuth φ of a beam. The high-altitude RRU may calculate the horizontal azimuth φ and the vertical azimuth φ of the beam according to the following formula 8.

$$\begin{cases} \phi = \arctan\left(\frac{y_0 - y_B}{x_0 - x_B}\right) \\ \varphi = \arcsin\left(\frac{z_0 - z_B}{L}\right) \end{cases} \quad (8)$$

In one embodiment of the present invention, after determining the beam direction, the high-altitude RRU calculates the beam width. The beam width is determined based on a horizontal lobe angle θ and a vertical lobe angle ψ. A method for obtaining a horizontal lobe angle of a beam may be as follows.

The high-altitude RRU may calculate the horizontal lobe angle θ of the beam according to the following formula 9.

$$\theta = 2 \cdot \arctan\left(\frac{L_1}{L}\right) \quad (9)$$

$L_1$ is a first preset value ($L_1 \geq R$, and R is the radius of the flight track). It should be noted that $L_1$ may be the radius of the flight track, or may be a value greater than the radius of the flight track.

A method for obtaining a vertical lobe angle of a beam may be as follows.

The high-altitude RRU may calculate the vertical lobe angle ψ of the beam according to the following formula 10.

$$\psi = \arctan\left(\frac{\sqrt[2]{(x_B - x_0)^2 + (y_B - y_0)^2} + L_1}{z_0 - z_B}\right) - \arctan\left(\frac{\sqrt[2]{(x_B - x_0)^2 + (y_B - y_0)^2} - L_1}{z_0 - z_B}\right) \quad (10)$$

According to the foregoing methods for calculating the beam direction and the beam width, the high-altitude RRU can control a signal beam to the ground BBU. The high-altitude RRU sends the location information to the ground BBU. It should be noted that, for a moment at which the high-altitude RRU sends location information, the high-altitude RRU may send one piece of location information to the ground BBU after obtaining the one piece of location information, or may send a plurality of pieces of location information to the ground BBU after obtaining the plurality of pieces of location information, or may send location information to the ground BBU as required.

In a third case, the high-altitude device may not calculate the beam direction or the beam width, and the beam direction and the beam width are preset to provide a wide coverage area. In this way, calculation load of the high-altitude device can be reduced, but an antenna gain is relatively low. For example, the beam direction of the high-altitude device may be a direction perpendicular to the ground, and the beam width may be 180 degrees. This can ensure that the ground device can receive information from the high-altitude device within a preset distance. It should be noted that another beam direction and another beam angle are also acceptable.

In addition, the aerial RRU is affected by turbulence to jolt or jitter, causing a change of the beam direction. The high-altitude RRU is configured to periodically obtain the posture information of the high-altitude RRU. The high-altitude RRU compensates for a horizontal azimuth φ and a vertical azimuth φ of a beam based on the posture information, so that the beam direction aims at the ground BBU. Specifically, the posture information may be information about polar coordinates, or may be other information. A specific calculation method is not specifically limited in this embodiment of the present invention.

Block 202. The ground BBU receives and stores the location information of the high-altitude RRU, performs beam control, and sends beam width information to the high-altitude RRU.

A method in which the ground BBU obtains a beam direction and a beam width according to a central point and a radius that are of a flight track of the high-altitude RRU, and the location information of the high-altitude RRU varies according to different expected beam coverage areas, and may specifically include the following two cases.

In a first case, when an expected beam coverage area covers only the high-altitude RRU, a higher gain can be obtained, but the ground BBU needs to frequently control a beam. This increases a quantity of times the high-altitude RRU sends the location information to the ground BBU. As shown in FIG. 3A, a method for obtaining the beam direction may be as follows.

At the specified moment $t_1$, the location of the high-altitude RRU is $(x_{t_1}, y_{t_1}, z_{t_1})$, and the location information is sent to the ground BBU. The ground BBU periodically receives and stores the location information of the high-altitude RRU. It should be noted that upon obtaining the location information, the high-altitude RRU sends the location information to the ground BBU. An interval between a moment at which the ground BBU receives the location information and a moment at which the high-altitude RRU obtains the location information is very small, and a moving distance of the high-altitude RRU within the interval is also very small, and it may be approximately considered that there is no movement. For example, a value of the distance between the high-altitude RRU and the ground BBU is 100 km, a value of a signal transmission delay is 0.33 ms, a value of a signal processing delay may be 1 ms, and a value of the interval is 1.33 ms. A value of a speed of the high-altitude RRU may be 20 m/s, and a value of the moving distance within the interval is 26.6 mm, and it may be approximately considered that there is no movement.

The ground BBU may calculate the distance $L_{t_1}$ between the ground BBU and the high-altitude RRU according to the foregoing formula (3), where $(x_B, y_B, z_B)$ is the location of the ground BBU.

The beam direction is determined based on a horizontal azimuth φ and a vertical azimuth φ of a beam. The ground BBU may calculate the horizontal azimuth φ and the vertical azimuth φ of the beam according to the foregoing formula (4).

Figure 4A:
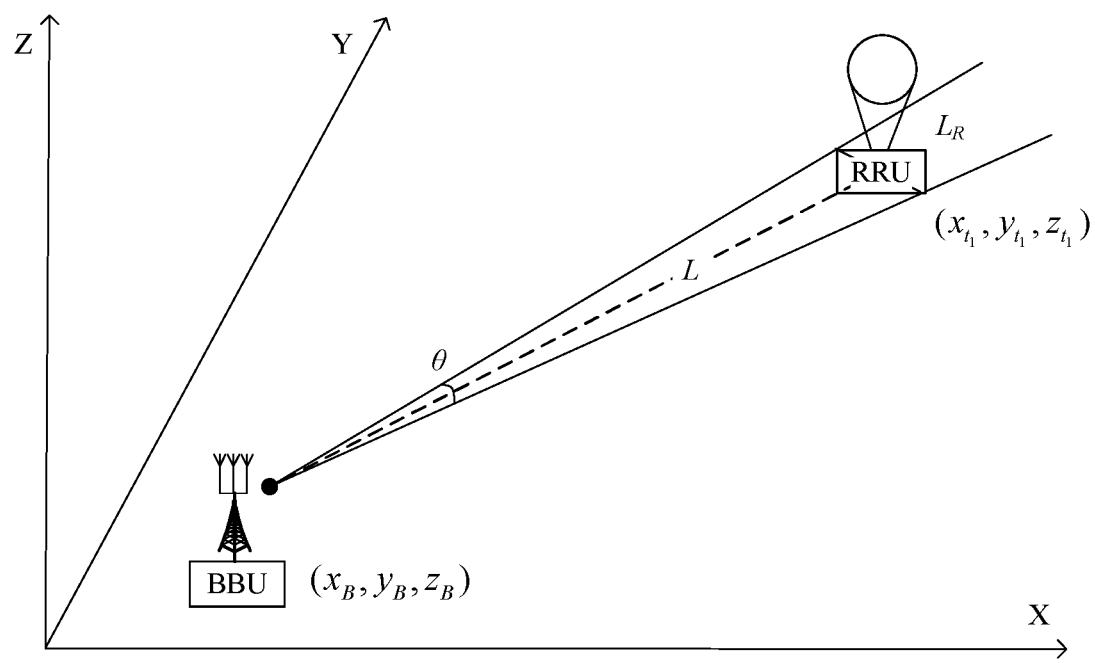
FIG. 4A is a schematic diagram of another method for obtaining a horizontal lobe angle of a beam according to an embodiment of the present invention.

In one embodiment of the present invention, after determining the beam direction, the ground BBU calculates the beam width. The beam width is determined based on a horizontal lobe angle θ and a vertical lobe angle ψ. As shown in FIG. 4A, a method for obtaining a horizontal lobe angle of a beam may be as follows.

The ground BBU may calculate the horizontal lobe angle θ of the beam according to the foregoing formula (5).

It should be noted that the high-altitude RRU device includes an antenna system, and $L_2$ may be a size of the high-altitude RRU, or may be a size of the antenna system, or may be a value greater than the size of the high-altitude RRU.

Figure 4B:
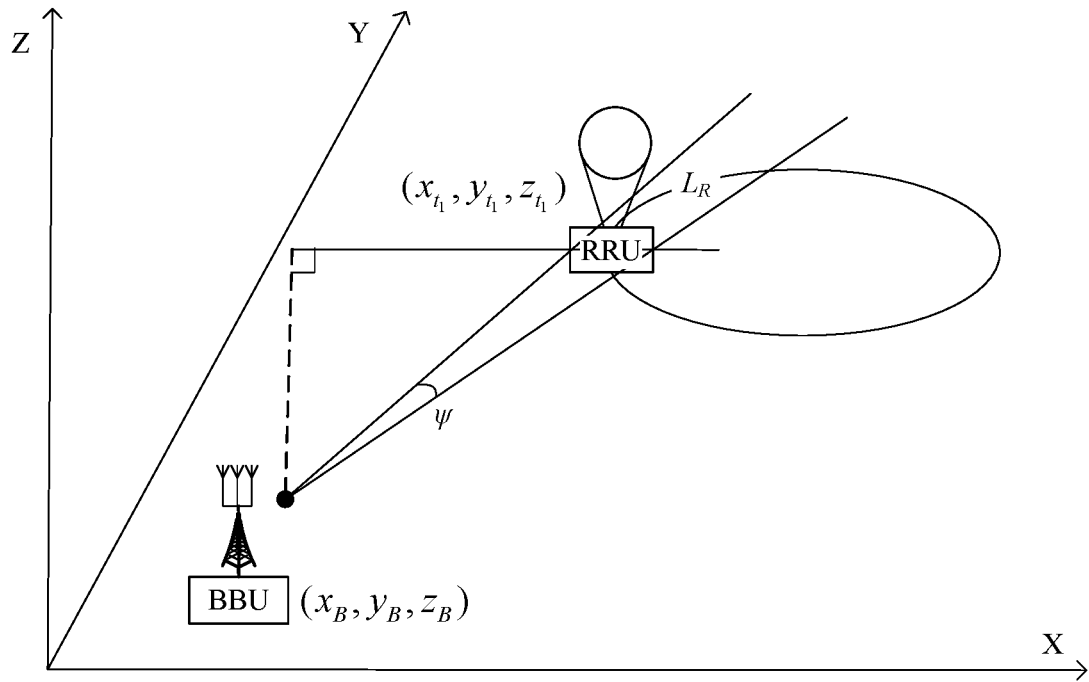
FIG. 4B is a schematic diagram of another method for obtaining a vertical lobe angle of a beam according to an embodiment of the present invention.

As shown in FIG. 4B, a method for obtaining a vertical lobe angle of a beam may be as follows.

It should be noted that a value of the vertical lobe angle ψ of the beam varies according to different locations of the high-altitude RRU.

At the moment $t_1$, the ground BBU may calculate the vertical lobe angle ψ of the beam according to the foregoing formula (6).

In a second case, when an expected beam coverage area can cover a movement range of the high-altitude RRU, the ground BBU can avoid frequent beam direction control, and the high-altitude RRU can avoid frequent sending of the location information to the ground BBU, and sends the location information to the high-altitude RRU only in a specific condition. As shown in FIG. 3D, a method for obtaining the beam direction may be as follows.

The ground BBU receives and stores N(N≥3) pieces of location information. The ground BBU calculates the central point $(x_0, y_0, z_0)$ and the radius R that are of the flight track of the high-altitude RRU according to the foregoing formulas (1) and (2). It should be noted that information about the central point and the radius that are of the flight track may alternatively be calculated by the high-altitude RRU and sent to the ground BBU.

The ground BBU may calculate the distance L between the ground BBU and the central point of the flight track according to the foregoing formula (7), where $(x_B, y_B, z_B)$ is the location of the ground BBU.

The beam direction is determined based on a horizontal azimuth φ and a vertical azimuth φ of a beam. The ground BBU may calculate the horizontal azimuth φ and the vertical azimuth φ of the beam according to the foregoing formula (8).

Figure 4C:
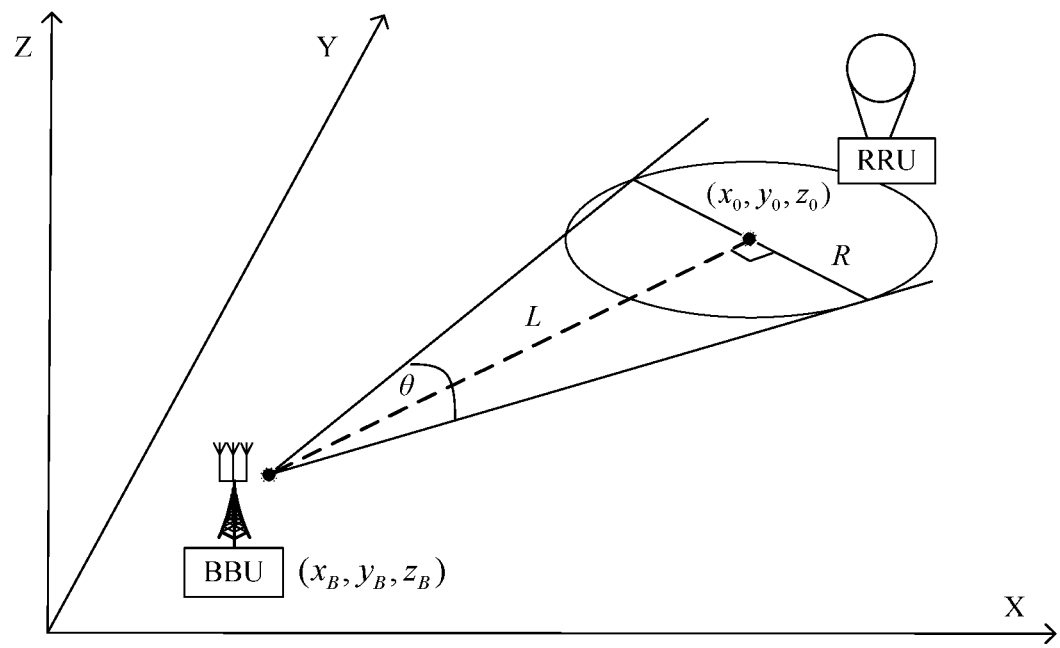
FIG. 4C is a schematic diagram of another method for obtaining a horizontal lobe angle of a beam according to an embodiment of the present invention.

In one embodiment of the present invention, after determining the beam direction, the ground BBU calculates the beam width. The beam width is determined based on a horizontal lobe angle θ and a vertical lobe angle ψ. As shown in FIG. 4C, a method for obtaining a horizontal lobe angle of a beam may be as follows.

The ground BBU may calculate the horizontal lobe angle θ of the beam according to the foregoing formula (9).

Figure 4D:
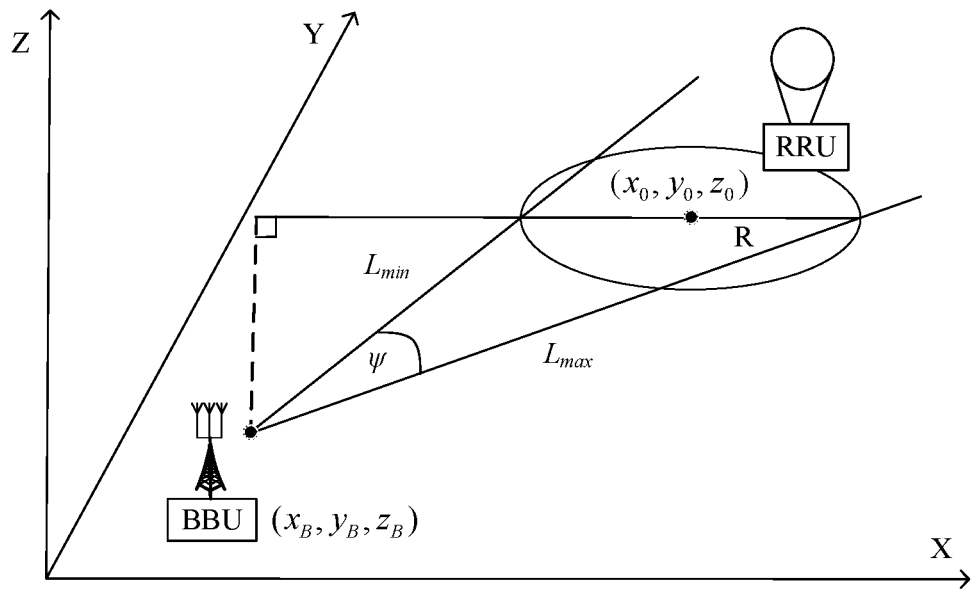
FIG. 4D is a schematic diagram of another method for obtaining a vertical lobe angle of a beam according to an embodiment of the present invention.

As shown in FIG. 4D, a method for obtaining a vertical lobe angle of a beam may be as follows.

The ground BBU may calculate the vertical lobe angle ψ of the beam according to the foregoing formula (10).

According to the foregoing methods for calculating the beam direction and the beam width, the ground BBU can control a signal beam to the high-altitude RRU. The ground BBU sends the beam width information to the high-altitude RRU. Specifically, the beam width information may be an angle value, or may be information indicating whether a beam coverage area of the ground BBU is point coverage.

In another embodiment of the present invention, a redundant area is added to the beam coverage area, to prevent the high-altitude RRU from deviating from the flight track due to an environmental factor such as turbulence, thereby avoiding interruption of a free space link between the high-altitude RRU and the ground BBU. Specifically, the ground BBU may obtain the horizontal lobe angle θ and the vertical lobe angle ψ of the beam according to the method for calculating the beam width, and obtain a horizontal lobe angle $θ'=n_1·θ$ and a vertical lobe angle $ψ'=n_2·ψ$ of the beam after redundancy is added. $n_1$ and $n_2$ are redundancy factors, $n_1>1$, and $n_2>1$. For example, the horizontal lobe angle is $θ'=1.1·θ$ after 10% redundancy is added, and the vertical lobe angle is $ψ'=1.1·ψ$ after 10% redundancy is added. It should be noted that the redundancy factors may be preconfigured by the ground BBU, or may be reconfigured according to a condition.

The high-altitude RRU may determine whether the high-altitude RRU deviates from the track by periodically obtaining the location information of the high-altitude RRU. Specifically, at a moment $t_2$, the location of the high-altitude RRU is $(x_{t_2}, y_{t_2}, z_{t_2})$, the central point of the flight track is $(x_0, y_0, z_0)$, and a value of a distance between the current location and the central point is calculated according to the following formula 11.

$$l = \sqrt[2]{(x_0 - x_{t_2})^2 + (y_0 - y_{t_2})^2} \quad (11)$$

Figure 5:
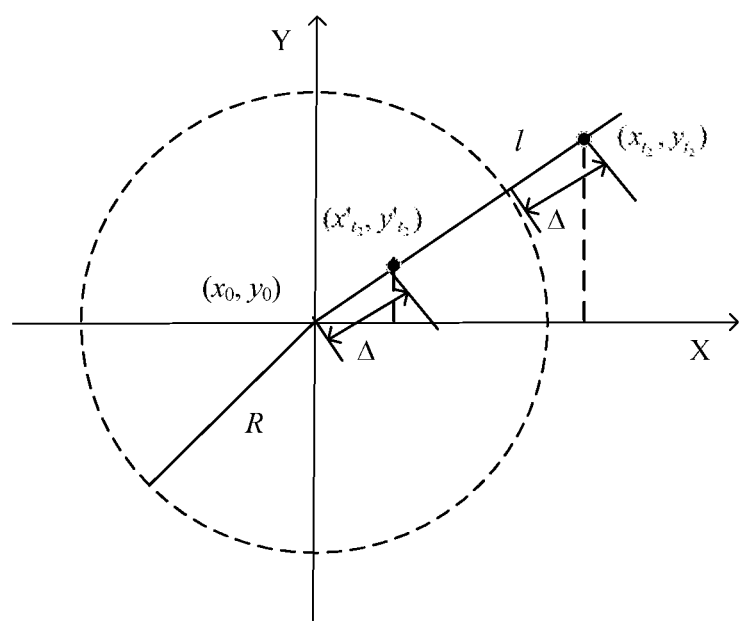
FIG. 5 is a schematic diagram of a beam direction control method according to an embodiment of the present invention.

As shown in FIG. 5, a method for controlling the beam direction may be as follows.

The high-altitude RRU compares the distance value l with a threshold T. If the distance value l is less than or equal to the threshold T, it indicates that the high-altitude RRU is away from a boundary of the coverage area, and performs no operation; or if the distance value l is greater than the threshold T, it indicates that the high-altitude RRU is quite close to the boundary of the coverage area, and may fly out of the coverage area. The high-altitude RRU) sends, to the ground BBU, location information $(x_{t_2}, y_{t_2}, z_{t_2})$ at the moment. It should be noted that the threshold may be preconfigured by the ground BBU, or may be reconfigured according to a condition.

The ground BBU receives the location information, and calculates the value l of the distance between the current location of the high-altitude RRU and the central point according to the foregoing formula (11). It should be noted that the distance value may alternatively be sent by the high-altitude RRU to the ground BBU.

A location deviation value is calculated according to the following formula 12. R is the radius of the flight track.

$$\Delta = l - R \quad (12)$$

A location of a new central point of a flight track is calculated according to the following formula 13.

$$\begin{cases} x'_0 = x_0 + \dfrac{\Delta}{l}(x_{t_2} - x_0) \\ y'_0 = y_0 + \dfrac{\Delta}{l}(y_{t_2} - y_0) \\ z'_0 = z_{t_2} \end{cases} \quad (13)$$

The ground BBU calculates a new beam direction according to the location $(x_0', y_0', z_0')$ of the new central point, and controls a signal beam to the high-altitude RRU. A specific method for calculating the beam direction is the same as the method for calculating the beam direction in step 202, and details are not described herein.

After a period of time, at a moment $t_3$, the location of the high-altitude RRU is $(x_{t_3}, y_{t_3}, z_{t_3})$. If the distance value l is less than or equal to the threshold T, the high-altitude RRU sends, to the ground BBU, location information at this moment. After receiving the location information, the ground BBU controls the signal beam to the high-altitude RRU according to the original beam direction calculated according to the location $(x_0, y_0, z_0)$ of the original central point.

Block 203. The high-altitude RRU receives and stores the beam width information, and adjusts an interval of sending the location information to the ground BBU.

The high-altitude RRU determines, according to the beam width information, whether the signal beam from the ground BBU covers the movement range of the high-altitude RRU or covers only the high-altitude RRU. The interval of sending the location information to the ground BBU by the high-altitude RRU varies according to different beam coverage areas.

Figure 6:
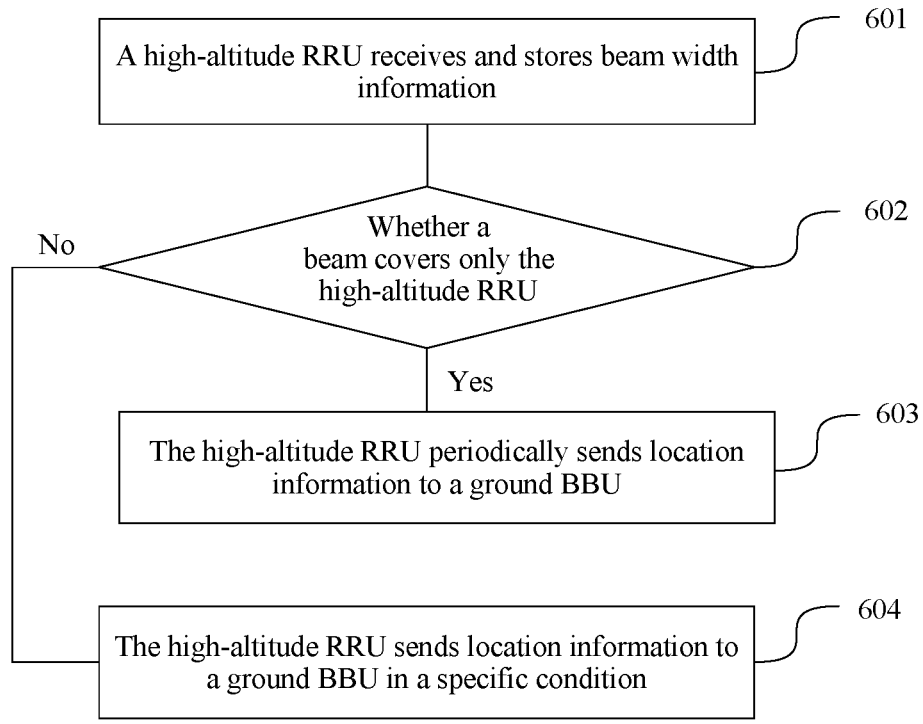
FIG. 6 is a flowchart of a method for determining an interval of sending location information according to an embodiment of the present invention.

FIG. 6 is a process in which the high-altitude RRU determines the interval of sending the location information, including the following operations.

Block 601. The high-altitude RRU receives and stores the beam width information.

In one embodiment, the beam width information may be an angle value, or may be information indicating whether a beam coverage area of the ground BBU is point coverage.

Block 602. The high-altitude RRU determines, according to the beam width information, whether a beam covers only the high-altitude RRU, and if the beam covers only the high-altitude RRU, block 603 is performed, or if the beam covers not only the high-altitude RRU, block 604 is performed.

In one embodiment, if the beam width information is an angle value, the high-altitude RRU calculates the beam coverage area according to the angle value, to determine whether the beam coverage area is point coverage or area coverage. A specific method for calculating the beam coverage area is the same as the method for calculating the beam width in block 202, and details are not described herein.

Block 603. The high-altitude RRU periodically sends the location information to the ground BBU.

Upon periodically obtaining the location information, the high-altitude RRU sends the location information to the ground BBU. The ground BBU receives the location information, calculates the beam direction, and controls the beam to aim at the high-altitude RRU, to obtain a high antenna gain. It should be noted that because the high-altitude RRU periodically sends the location information to the ground BBU, information exchanged between the high-altitude RRU and the ground BBU increases.

Block 604. The high-altitude RRU sends the location information to the ground BBU in a specific condition.

When the beam covers the movement range of the high-altitude RRU, after the high-altitude RRU periodically obtains the location information, the high-altitude RRU sends the location information to the high-altitude RRU only in a specific condition, without periodically sending the location information to the ground BBU. For example, the high-altitude RRU calculates the location deviation value according to the location information, and determines whether the location deviation value is greater than a threshold. If the location deviation value is greater than the threshold, the high-altitude RRU sends current location information to the ground BBU. The ground BBU may not need to frequently control the beam direction.

Block 204. The ground BBU calculates link quality, sends switching control information to the high-altitude RRU, and performs adaptive switching on a wireless fronthaul link.

Figure 7A:
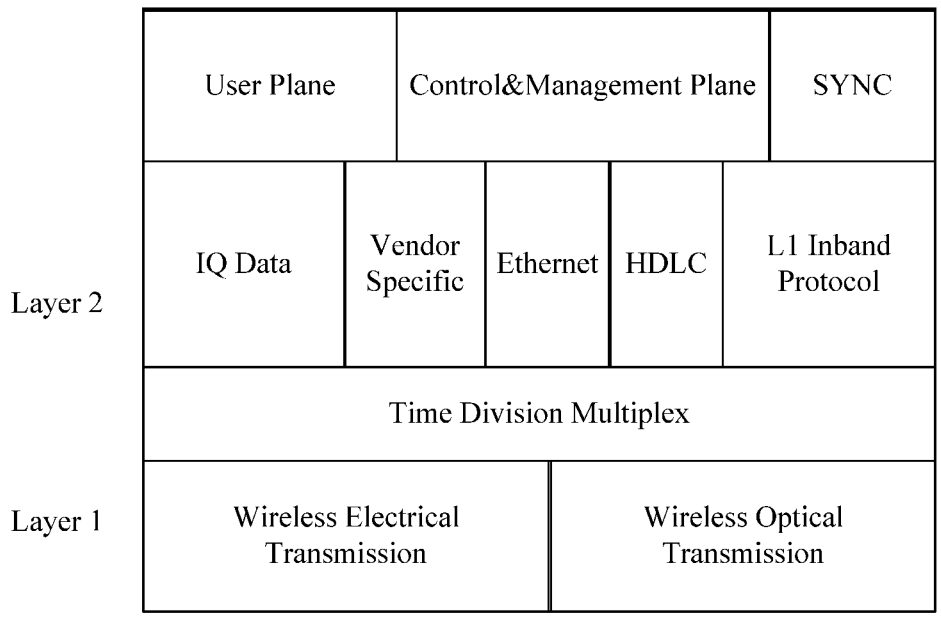
FIG. 7A is a schematic diagram of an architecture of a wireless CPRI protocol according to an embodiment of the present invention.

The ground BBU may include a free space optical link and a microwave link. The high-altitude RRU may include a free space optical link and a microwave link. The high-altitude RRU may communicate with the ground BBU by using a wireless CPRI protocol, or may communicate with another high-altitude RRU by using the wireless CPRI protocol. As shown in FIG. 7A, the wireless CPRI protocol includes two types of physical interfaces: a radio transmission interface and a wireless optical transmission interface. Specifically, the radio transmission interface transmits a microwave signal (for example, a millimeter wave), and the wireless optical transmission interface transmits an optical signal (for example, a laser). A link between a ground BBU and a high-altitude RRU and a link between high-altitude RRUs may be referred to as a wireless fronthaul link.

Some weather factors are detrimental to the wireless fronthaul link, including rain, snow, fog, haze, dust, and the like, because relatively large absorption attenuation is caused when a wavelength of an electromagnetic wave is close to or even smaller than a size of an air particle. For example, because a frequency (approximately 200 THz to 300 THz) of laser communication is much higher than a frequency (30 GHz to 300 GHz) of a millimeter-wave, the frequency of the laser communication is more affected by environmental factors. Laser communication provides a higher transmission rate than a millimeter-wave. To reach a specified transmission rate, fewer laser communication links are required than millimeter-wave links. For example, a transmission rate of the laser communication may be 10 Gbps, and a transmission rate of the millimeter wave may be 2.5 Gbps. A communication link that has a transmission rate of 10 Gbps can be obtained by using only one laser link, but four millimeter-wave links are required to obtain the communication link. In this case, power consumption of the millimeter-wave link is higher than power consumption of the laser link. In different cases, a laser link or a millimeter-wave link needs to be adaptively selected to implement lower power consumption. Specifically, when quality of the wireless fronthaul link is good, wireless fronthaul is preferentially performed through laser communication. When the quality of the wireless fronthaul link is poor, wireless fronthaul is performed through millimeter-wave communication. An initial state of the wireless fronthaul link may be a radio transmission interface or a wireless optical transmission interface.

Figure 7B:
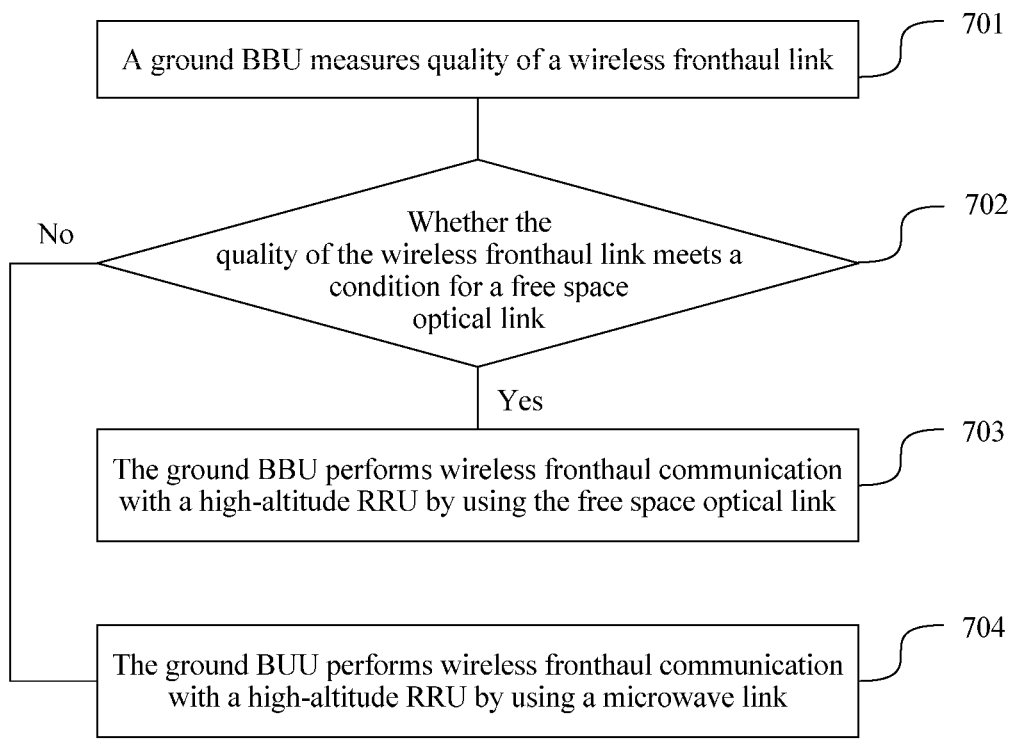
FIG. 7B is a flowchart of switching on a wireless fronthaul link according to an embodiment of the present invention.

FIG. 7B is a process of adaptive link switching, including the following operations.

Block 701. The ground BBU measures the quality of the wireless fronthaul link.

In one embodiment, the ground BBU may measure the quality $Q_f$ of the wireless fronthaul link according to a bit error rate of received data. For example, $Q_f$ may be quantized to a specific value from 0 to 255. A larger value indicates better quality of the link, and a smaller value indicates poorer quality of the link. The quality of the wireless fronthaul link may alternatively be measured by using another method, and this is not specifically limited in this embodiment of the present invention.

Block 702. The ground BBU determines whether to use a free space optical link according to the quality of the wireless fronthaul link, and if a determining result is to use the free space optical link, block 703 is performed, or if a determining result is not to use the free space optical link, block 704 is performed.

The ground BBU compares the quality $Q_f$ of the wireless fronthaul link with a threshold T. If the quality $Q_f$ of the wireless fronthaul link is greater than the threshold T, it indicates that the quality of the wireless fronthaul link can meet a condition for the free space optical link, and the free space optical link is used to perform wireless fronthaul communication. If the quality $Q_f$ of the wireless fronthaul link is less than or equal to the threshold T, it indicates that the quality of the wireless fronthaul link does not meet the condition for the free space optical link, and a microwave link is used to perform the wireless fronthaul communication. It should be noted that the threshold may be preconfigured by the ground BBU, or may be reconfigured according to a condition.

Block 703. The ground BBU performs wireless fronthaul communication with the high-altitude RRU by using the free space optical link.

The ground BBU sends the switching control information to the high-altitude RRU. The high-altitude RRU receives the switching control information, performs wireless fronthaul communication by using the free space optical link according to an indication in the switching control information, and sends confirmation information to the ground BBU.

Block 704. The ground BBU performs wireless fronthaul communication with the high-altitude RRU by using a microwave link.

The ground BBU sends the switching control information to the high-altitude RRU. The high-altitude RRU receives the switching control information, performs wireless fronthaul communication by using the microwave link according to an indication in the switching control information, and sends confirmation information to the ground BBU.

It should be noted that the high-altitude RRU may also measure quality of a wireless fronthaul link, to perform adaptive switching on a link between high-altitude RRUs.

In another embodiment of the present invention, the CPRI protocol includes a plurality of control words for synchronization and control management of a fronthaul link. Definitions of the control words are shown in Table 1.

TABLE 1

| Subchannel Number Ns | Purpose of Subchannel | Xs = 0 | Xs = 1 | Xs = 2 | Xs = 3 |
| --- | --- | --- | --- | --- | --- |
| 0 | sync&timing | sync byte | HFN | BFN-low | BFN-high |
| 1 | slow C&M | slow C&M | slow C&M | slow C&M | slow C&M |
| 2 | L1 inband prot. | Version | Startup | L1-reset-LOS . . . | pointer p |
| 3 | Reserved | Reserved | Reserved | Reserved | Reserved |
| 4 | Ctrl_AxC low Byte | Ctrl_AxC | Ctrl_AxC | Ctrl_AxC | Ctrl_AxC |
| 5 | Ctrl_AxC low Byte | Ctrl_AxC | Ctrl_AxC | Ctrl_AxC | Ctrl_AxC |
| 6 | Ctrl_AxC high Byte | Ctrl_AxC | Ctrl_AxC | Ctrl_AxC | Ctrl_AxC |
| 7 | Ctrl_AxC high Byte | Ctrl_AxC | Ctrl_AxC | Ctrl_AxC | Ctrl_AxC |
| 8 | Reserved | Reserved | Reserved | Reserved | Reserved |
| . . . | . . . | . . . | . . . | . . . | . . . |
| 15 | Reserved | Reserved | Reserved | Reserved | Reserved |

TABLE 1-continued

| Subchannel Number Ns | Purpose of Subchannel | Xs = 0 | Xs = 1 | Xs = 2 | Xs = 3 |
|---|---|---|---|---|---|
| 16 | vendor specific | vendor specific | vendor specific | vendor specific | vendor specific |
| ... | ... | ... | ... | ... | ... |
| p-1 | vendor specific | vendor specific | vendor specific | vendor specific | vendor specific |
| pointer: p | fast C&M | fast C&M | fast C&M | fast C&M | fast C&M |
| ... | ... | ... | ... | ... | ... |
| 63 | fast C&M | fast C&M | fast C&M | fast C&M | fast C&M |

In the table, vendor specific may be defined by manufacturers.

Content of the switching control information includes transmission by using a radio transmission interface or transmission by using an optical transmission interface. For example, a configuration of the switching control information may be shown in Table 2.

TABLE 2

| Number (Z.X.Y) | Name | Bit Width | Value Range | Default Value | Description |
|---|---|---|---|---|---|
| Z.16.0 | Switch | Bit 0 | "0" to "1" | "0" | "0": transmission by using a radio transmission interface; "1": transmission by using an optical transmission interface. |

Z is a quantity of superframes, X is a quantity of basic frames in a superframe, Y is a quantity of bytes in each word, and content of other bits (for example, Bit 7 to Bit 1) is reserved.

The ground BBU sends switch information to the high-altitude RRU. If a value is "0", it indicates that wireless fronthaul communication is performed by using a microwave link. If the value is "1", it indicates that wireless fronthaul communication is performed by using a free space optical link. After receiving the switch information, the high-altitude RRU uses a corresponding link to perform wireless fronthaul communication, and sends same switch information to the ground BBU for confirmation.

Figure 8:
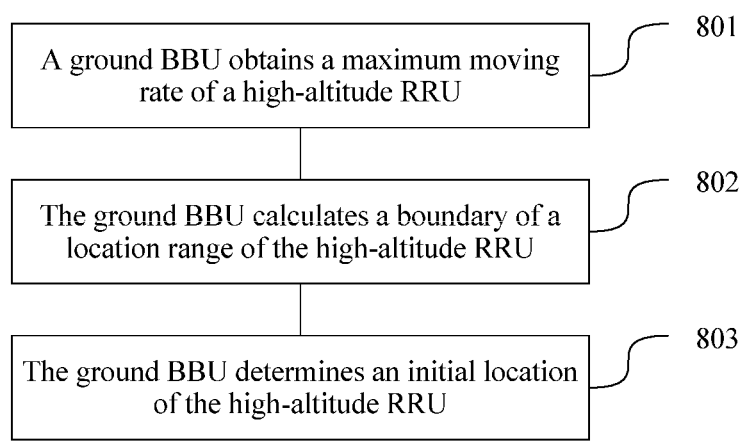
FIG. 8 is a flowchart of a method for determining a boundary of a location range of a high-altitude RRU according to an embodiment of the present invention.

FIG. 8 is a flowchart of a method for determining a boundary of a location range of a high-altitude RRU according to an embodiment of the present invention. The high-altitude RRU continuously moves in the stratosphere, causing a Doppler frequency shift. This affects quality of a wireless fronthaul link. A location of the aerial RRU needs to be constrained, to control the high-altitude RRU to move within the boundary of the location range, so as to prevent quality of wireless fronthaul communication from being affected. Referring to FIG. 8, the method includes the following operations.

Block 801. A ground BBU obtains a maximum moving rate of the high-altitude RRU.

The high-altitude RRU flies along a flight track, so that the high-altitude RRU may fly downwind or against the wind. When the high-altitude RRU flies downwind, a speed is high, or when the high-altitude RRU flies against the wind, a speed is low. A moving speed of the high-altitude RRU is non-constant. The high-altitude RRU periodically obtains a location of the high-altitude RRU, and sends location information to the ground BBU.

The ground BBU receives the location information. At a moment $t_4$, the location of the high-altitude RRU is $(x_{t_4}, y_{t_4}, z_{t_4})$. At a moment $t_5$, the location of the high-altitude RRU is $(x_{t_5}, y_{t_5}, z_{t_5})$. An average rate in a time period between $t_4$ and $t_5$ is calculated according to the following formula 14.

$$v = \frac{\sqrt[2]{(x_{t_5} - x_{t_4})^2 + (y_{t_5} - y_{t_4})^2 + (z_{t_5} - z_{t_4})^2}}{t_5 - t_4} \quad (14)$$

In one or more flight cycles, the high-altitude RRU calculates a plurality of speed values $v=[v_1 \; v_2 \; L \; v_R]$, to obtain a maximum moving rate value $v_{max}$. It should be noted that the high-altitude RRU may alternatively calculate a maximum moving rate value, and send the maximum moving rate value to the ground BBU.

Block 802. The ground BBU calculates the boundary of the location range of the high-altitude RRU.

For example, a maximum frequency offset allowed for the wireless fronthaul link is $\Delta f_{max}$, a location of the ground BBU is $(x_B, y_B, z_B)$, and an initial location of the high-altitude RRU is $(x_R, y_R, z_R)$. The boundary of the location range of the high-altitude RRU may be calculated according to the following formula 15.

$$\cos \theta = \frac{\sqrt[2]{L^2 - H^2}}{L} < \Delta f_{max} \cdot \frac{\lambda}{v_{max}} \quad (15)$$

$v_{max}$ is the maximum moving rate value, $\lambda$ is a wavelength, $\theta$ is an angle between a moving direction and an incident wave direction, L is a value of a distance between the ground BBU and the high-altitude RRU, and H is a difference between a vertical elevation of the ground BBU and a vertical elevation of the high-altitude RRU.

Block 803. The ground BBU determines an initial location of the high-altitude RRU.

The ground BBU may determine the initial location of the high-altitude RRU according to the boundary of the location range of the high-altitude RRU, and send location information to the high-altitude RRU. After receiving the location information, the high-altitude RRU may move to a specified location according to the location information.

At a same altitude, a larger distance between the high-altitude RRU and the ground BBU indicates a larger Doppler frequency shift.

When a center of the flight track of the high-altitude RRU is right above the ground BBU (or the high-altitude RRU is right above the ground BBU), the Doppler frequency shift is zero. In this case, the location of the high-altitude RRU is optimal.

In addition, the ground BBU may re-perform network planning as required, to update the initial location of the high-altitude RRU.

In the technical solution provided in this embodiment of the present invention, the high-altitude device and the ground device are separated, the beam direction is determined based on the location information of the high-altitude device or the location information of the ground device, and the beam width information is sent in the beam direction. The beam width information is used to adjust the interval of sending the location information of the high-altitude device, and a larger beam width indicated in the beam width information leads to a longer interval of sending the location information of the high-altitude device. In this way, an amount of information exchanged over an air interface between the ground device and the high-altitude device can be reduced, and the ground device does not need to adjust the beam direction in real time. This reduces power consumption of the ground device, and improves an antenna gain of the ground device.

Figure 9:
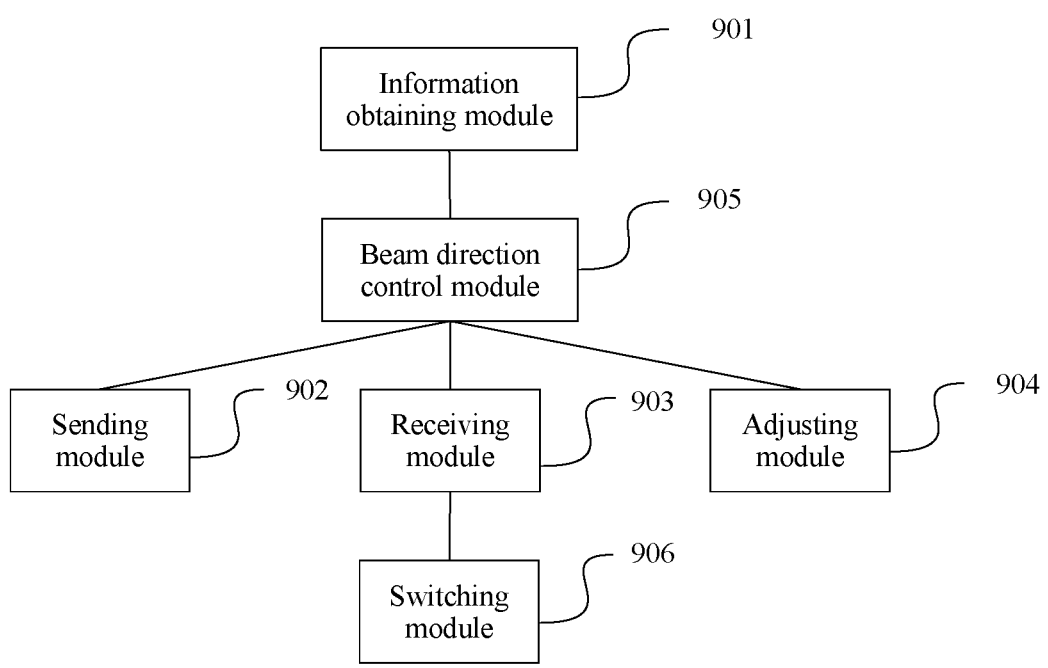
FIG. 9 is an apparatus block diagram of a high-altitude device according to an embodiment of the present invention.

FIG. 9 is an apparatus block diagram of a high-altitude device according to an embodiment of the present invention. Referring to FIG. 9, the high-altitude device includes an information obtaining module 901, a sending module 902, a receiving module 903, and an adjusting module 904. In addition, optionally, as shown in FIG. 9, the high-altitude device may further include a beam direction control module 905 and a switching module 906. It should be noted that the two modules are not mandatory. The following describes the modules in detail.

In a beam control process, the information obtaining module 901 is configured to periodically obtain location information and posture information of the high-altitude device. The information obtaining module 901 may include one or more of a Global Positioning System (Global Positioning System, GPS), an inertial navigation system, and various motion sensors (such as an accelerometer, a magnetometer, and a gyroscope).

The sending module 902 is configured to send the location information of the high-altitude device to the ground device, where the ground device is located in a ground network, the high-altitude device is located in an aerial network, and a beam of the high-altitude device covers the ground device.

In one embodiment, in the beam control process, the sending module 902 may further be configured to send the location information of the high-altitude device to the ground device and another high-altitude device.

In one embodiment, in an adaptive link switching process, the sending module is further configured to send switching control information to the ground device.

In one embodiment, in a process of determining an initial location of the high-altitude device, the sending module is further configured to send moving rate information to the ground device.

In one embodiment, in the beam control process, the sending module is further configured to send coordinates of a new central location of a moving track to the ground device.

In the beam control process, the receiving module 903 is configured to receive beam width information sent by the ground device. The beam width information is calculated by the ground device according to the location information and location information of the ground device.

In one embodiment, in the adaptive link switching process, the receiving module 903 is further configured to receive switching control information sent by the ground device.

In the process of determining the initial position of the high-altitude device, the receiving module 903 is further configured to receive initial location information sent by the ground device.

In one embodiment, in the beam control process, the receiving module 903 is further configured to receive a track deviation threshold value sent by the ground device.

The adjusting module 904 is configured to adjust, according to the beam width information received by the receiving module 903, an interval of sending the location information of the high-altitude device, where a larger beam width indicated in the beam width information leads to a longer interval of sending the location information of the high-altitude device.

In one embodiment, as shown in FIG. 9, in the beam control process, the beam direction control module 905 is configured to calculate a beam direction and beam width information according to the location information of the high-altitude device and the location information of the ground device.

Specifically, in different cases, the beam direction control module 905 may include different units.

In a first case, when the high-altitude device expects frequent beam direction control, a beam coverage area may cover only the ground device. The beam direction control module 905 includes: a radius calculation module, a distance calculation module, a beam direction calculation module, and a beam width information calculation module.

The radius calculation module 90510 is configured to calculate a radius of the moving track according to the location information of the high-altitude device.

In one embodiment, the radius calculation module 90510 may obtain the radius R of the flight track of the high-altitude device according to the foregoing formula (2).

The distance calculation module 90520 is configured to calculate a distance between the ground device and the high-altitude device according to the location information of the ground device and the location information of the high-altitude device.

In one embodiment, the distance calculation module may calculate the distance $L_{t_1}$ between the ground device and the high-altitude device according to the foregoing formula (3).

The beam direction calculation module is configured to calculate the beam direction according to the distance that is between the ground device and the high-altitude device and that is calculated by the distance calculation module, the location information of the high-altitude device, and the location information of the ground device.

In one embodiment, the beam direction calculation module may calculate a horizontal azimuth $\phi$ and a vertical azimuth $\varphi$ of a beam according to the foregoing formula (4).

The beam width information calculation module is configured to calculate the beam width information according to the distance that is between the ground device and the high-altitude device and that is calculated by the distance calculation module, a second preset value, the location information of the high-altitude device, and the location information of the ground device, where the second preset value is greater than zero and less than or equal to the radius of the moving track.

In one embodiment, the beam width information calculation module 90540 may calculate a horizontal lobe angle $\theta$ of a beam according to the foregoing formula (5), and calculate the horizontal lobe angle $\psi$ of the beam according to the foregoing formula (6).

In a second case, when the high-altitude device expects infrequent beam direction control, the high-altitude device requires that a beam width may include a flight range of the high-altitude device. The beam direction control module includes: a track center coordinates calculation unit and a direction and width calculation unit.

The track center coordinates calculation unit is configured to calculate coordinates of a central location of a moving track of the high-altitude device according to the location information of the high-altitude device.

That is, the track center coordinates calculation unit may calculate the coordinates $(x_0, y_0, z_0)$ of the central location of the moving track of the high-altitude device according to the foregoing formula (1).

The direction and width calculation unit is configured to calculate the beam direction and the beam width information according to the coordinates of the central location of the moving track that are calculated by the track center coordinates calculation unit and the location information of the ground device.

Optionally, in an embodiment, the direction and width calculation unit specifically includes: a radius calculation subunit, a distance calculation subunit, and a beam direction calculation subunit.

The radius calculation subunit is configured to calculate a radius R of the flight track of the high-altitude device according to the location information of the high-altitude device (for example, a plurality of locations of the high-altitude device).

The distance calculation subunit is configured to calculate a distance between the ground device and the central location of the moving track according to the coordinates of the central location of the moving track that are calculated by the track center coordinates calculation unit 9051 and the location information of the ground device.

In one embodiment, the distance calculation subunit calculates the distance L between the ground device and the coordinates of the central location of the flight track according to the foregoing formula (7).

The beam direction calculation subunit is configured to calculate the beam direction according to the distance calculated by the distance calculation subunit, the coordinates of the central location of the moving track that are calculated by the track center coordinates calculation unit 9051, and the location information of the ground device.

In one embodiment, the beam direction calculation subunit may calculate a horizontal azimuth $\phi$ and a vertical azimuth $\varphi$ of a beam according to the foregoing formula (8).

The beam width information calculation subunit is configured to calculate the beam width information according to the distance calculated by the distance calculation subunit, a first preset value, the coordinates of the central location of the moving track that are calculated by the track center coordinates calculation unit, and the location information of the ground device, where the first preset value is greater than or equal to the radius of the moving track.

Specifically, the beam width information calculation subunit may calculate a horizontal lobe angle $\theta$ of a beam according to the foregoing formula (9), and calculate the horizontal lobe angle $\psi$ of the beam according to the foregoing formula (10).

In one embodiment, in the beam control process, the beam direction control module 905 is further configured to calculate coordinates of a new central location of a moving track according to flight track deviation information of the high-altitude device.

In one embodiment, in the beam control process, the beam direction control module 905 is further configured to compensate for the beam direction based on the posture information.

In one embodiment, the high-altitude device may be an RRU, and the ground device may be a BBU. Optionally, when the ground device is a BBU or a cloud baseband processing unit, the cloud baseband processing unit includes a plurality of BBUs, and the high-altitude device is an RRU, the receiving module is further configured to receive a switching control command from the ground device, and the high-altitude device further includes:

the switching module 906, where the module is configured to: after the receiving module receives the switching control command from the ground device, switch to, according to information carried in the control command, a corresponding interface to perform wireless fronthaul communication.

In one embodiment, the high-altitude device and the ground device are separated, the beam direction is determined based on the location information of the high-altitude device or the location information of the ground device, and the beam width information is sent in the beam direction. The beam width information is used to adjust the interval of sending the location information of the high-altitude device, and a larger beam width indicated in the beam width information leads to a longer interval of sending the location information of the high-altitude device. In this way, an amount of information exchanged over an air interface between the ground device and the high-altitude device can be reduced, and the ground device does not need to adjust the beam direction in real time. This reduces power consumption of the ground device, and improves an antenna gain of the ground device.

Figure 10:
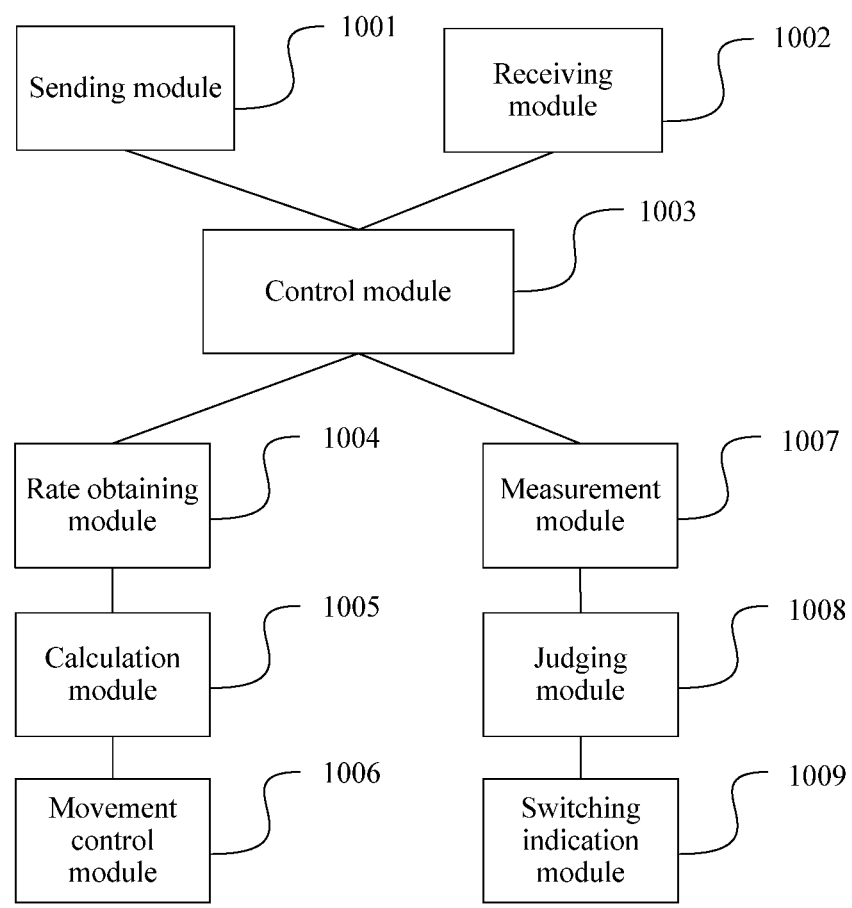
FIG. 10 is an apparatus block diagram of a ground device according to an embodiment of the present invention.

FIG. 10 is an apparatus block diagram of a ground device according to an embodiment of the present invention. Referring to FIG. 10, the apparatus includes: a sending module 1001, a receiving module 1002, and a control module 1003. Optionally, as shown in FIG. 10, the ground device may further include: a rate obtaining module 1004, a calculation module 1005, a movement control module 1006, a measurement module 1007, a judging module 1008, and a switching indication module 1009. Certainly, theses modules are not mandatory.

In a beam control process, the receiving module 1002 is configured to receive location information sent by a high-altitude device.

In an adaptive link switching process, the receiving module 1002 is further configured to receive switching control information sent by the high-altitude device.

In one embodiment, in a process of determining an initial location of the high-altitude device, the receiving module 1002 is further configured to receive moving rate information sent by the high-altitude device.

In one embodiment, in the beam control process, the receiving module 1002 is further configured to receive coordinates of a new central location of a moving track that are sent by the high-altitude device.

In the beam control process, the control module 1003 is configured to calculate a beam direction and beam width information according to location information of the ground device and the location information of the high-altitude device received by the receiving module 1002.

The sending module 1001 is configured to send the beam width information to the high-altitude device in the beam direction determined by the control module 1003, where the beam width information is used to adjust an interval of sending the location information of the high-altitude device.

In one embodiment, in the adaptive link switching process, the sending module 1001 is further configured to send switching control information to the high-altitude device.

In one embodiment, in the process of determining the initial location of the high-altitude device, the sending module 1001 is further configured to send initial location information to the high-altitude device.

In one embodiment, in the beam control process, the sending module 1001 is further configured to send a track deviation threshold value to the high-altitude device.

In a first case, when an expected beam coverage area of the ground device covers only the high-altitude device, a higher gain can be obtained. The control module 1003 includes: a radius calculation module, a distance calculation module, a beam direction calculation module, and a beam width information calculation module.

The radius calculation module is configured to calculate a radius of the moving track according to the location information of the high-altitude device.

In one embodiment, the radius calculation module may obtain the radius R of the flight track of the high-altitude device according to the foregoing formula (2).

The distance calculation module is configured to calculate a distance between the ground device and the high-altitude device according to the location information of the ground device and the location information of the high-altitude device.

In one embodiment, the distance calculation module may calculate the distance $L_{t_1}$ between the ground device and the high-altitude device according to the foregoing formula (3).

The beam direction calculation module is configured to calculate the beam direction according to the distance that is between the ground device and the high-altitude device and that is calculated by the distance calculation module, the location information of the high-altitude device, and the location information of the ground device.

Specifically, the beam direction calculation module may calculate a horizontal azimuth $\phi$ and a vertical azimuth $\varphi$ of a beam according to the foregoing formula (4).

The beam width information calculation module is configured to calculate the beam width information according to the distance that is between the ground device and the high-altitude device and that is calculated by the distance calculation module, a second preset value, the location information of the high-altitude device, and the location information of the ground device, where the second preset value is greater than zero and less than or equal to the radius of the moving track.

In one embodiment, the beam width information calculation module may calculate a horizontal lobe angle $\theta$ of a beam according to the foregoing formula (5), and calculate the horizontal lobe angle $\psi$ of the beam according to the foregoing formula (6).

In a second case, when an expected beam coverage area of the ground device can cover a movement range of the high-altitude device, the ground device can avoid frequent beam direction control. The control module 1003 includes: a track center coordinates calculation unit and a direction and width calculation unit.

The track center coordinates calculation unit is configured to calculate coordinates of a central location of a moving track of the high-altitude device according to the location information of the high-altitude device.

In one embodiment, the track center coordinates calculation unit may calculate the coordinates $(x_0, y_0, z_0)$ of the central location of the moving track of the high-altitude device according to the foregoing formula (1).

The direction and width calculation unit is configured to calculate the beam direction and the beam width information according to the coordinates of the central location of the moving track that are calculated by the track center coordinates calculation unit and the location information of the ground device.

In one embodiment, the direction and width calculation unit includes: a radius calculation subunit, a distance calculation subunit, a beam direction calculation subunit, and a beam width information calculation subunit.

The radius calculation subunit is configured to calculate a radius R of the flight track of the high-altitude device according to the location information (for example, a plurality of locations) of the high-altitude device.

The distance calculation subunit is configured to calculate a distance between the ground device and the central location of the moving track according to the coordinates of the central location of the moving track that are calculated by the track center coordinates calculation unit 100310 and the location information of the ground device.

In one embodiment, the distance calculation subunit may calculate the distance L between the ground device and the coordinates of the central location of the flight track according to the foregoing formula (7).

The beam direction calculation subunit is configured to calculate the beam direction according to the distance calculated by the distance calculation subunit, the coordinates of the central location of the moving track that are calculated by the track center coordinates calculation unit 100310, and the location information of the ground device.

In one embodiment, the beam direction calculation subunit may calculate a horizontal azimuth $\phi$ and a vertical azimuth $\varphi$ of a beam according to the foregoing formula (8). After the horizontal azimuth $\phi$ and the vertical azimuth $\varphi$ of the beam are calculated, the beam direction is determined.

The beam width information calculation subunit is configured to calculate the beam width information according to the distance calculated by the distance calculation subunit, a first preset value, the coordinates of the central location of the moving track that are calculated by the track center coordinates calculation unit, and the location information of the ground device, where the first preset value is greater than or equal to the radius of the moving track.

In one embodiment, the beam width information calculation subunit may calculate a horizontal lobe angle $\theta$ of a beam according to the foregoing formula (9), and calculate the horizontal lobe angle $\psi$ of the beam according to the foregoing formula (10), to obtain the beam width information.

In one embodiment, in the beam control process, the control module 1003 is further configured to re-calculate the horizontal azimuth $\theta$ and the vertical azimuth $\varphi$ of the beam according to the foregoing formula (8) and the coordinates of the new central location of the moving track that are sent by the high-altitude device.

In one embodiment, as shown in FIG. 12, the ground device further includes: the rate obtaining module 1004, the calculation module 1005, the movement control module 1006, the measurement module 1007, the judging module 1008, and the switching indication module 1009. Functions of the modules are described as follows.

In a process of determining a boundary of a location range of the high-altitude device, the rate obtaining module 1004 is configured to obtain a maximum moving rate of the high-altitude device. The rate obtaining module 1004 specifically includes: a calculation unit and a rate determining unit.

The calculation unit is configured to calculate an average rate in a time difference between two different moments according to location information at the different moments that is obtained by the receiving module 1002. Specifically, the calculation unit may calculate the average rate in the time difference between the different moments according to the foregoing formula (14).

The rate determining unit is configured to obtain the maximum moving rate according to a plurality of average rate values in one or more flight cycles.

The calculation module 1005 is configured to calculate the boundary of the location range of the high-altitude device according to the maximum moving rate obtained by the rate obtaining module 1004.

In one embodiment, in the process of determining the boundary of the location range of the high-altitude device, the calculation module 1005 may calculate the boundary of the location range of the high-altitude device according to the foregoing formula (15).

In the process of determining the boundary of the location range of the high-altitude device, the movement control module 1006 is configured to control the high-altitude device to move within the boundary that is of the location range and that is calculated by the calculation module.

In a wireless fronthaul link switching process, the measurement module 1007 is configured to measure quality of a wireless fronthaul link.

In the wireless fronthaul link switching process, the judging module 1008 is configured to determine, according to the quality of the link measured by the measurement module, whether transmission interface switching needs to be performed on the wireless fronthaul link. The judging module 1008 includes:

a comparison unit, configured to compare the quality of the wireless fronthaul link measured by the measurement module with a threshold; and a judging unit, configured to: if the quality of the wireless fronthaul link is greater than the threshold, determine to perform wireless fronthaul communication by using a wireless optical transmission interface; or if the quality of the wireless fronthaul link is less than the threshold, determine to perform wireless fronthaul communication with the high-altitude device by using a radio transmission interface.

In the wireless fronthaul link switching process, the switching indication module 1009 is configured to send switching control information to the high-altitude device when it is determined that switching needs to be performed, to control transmission interface switching to be performed on the wireless fronthaul link.

With reference to FIG. 1A, an embodiment of the present invention further provides a distributed high-altitude device communications system, and the system includes a high-altitude front-end platform device and a ground processing platform device.

The high-altitude front-end platform device includes the high-altitude device according to the foregoing embodiment and an aerial device, where the aerial device carries the high-altitude device to camp in air, and the camping in air means moving within a specific range.

The ground processing platform device includes the ground device according to the foregoing embodiment and an antenna, where the antenna and the ground device cooperate to communicate with the high-altitude device.

The ground device is a BBU, a base station, or a cloud baseband processing unit, and the cloud baseband processing unit includes a plurality of BBUs. The high-altitude device is an RRU, a repeater, or an antenna.

In one embodiment, the high-altitude device and the ground device are separated, the beam direction is determined based on the location information of the high-altitude device or the location information of the ground device, and the beam width information is sent in the beam direction. The beam width information is used to adjust the interval of sending the location information of the high-altitude device, and a larger beam width indicated in the beam width information leads to a longer interval of sending the location information of the high-altitude device. In this way, an amount of information exchanged over an air interface between the ground device and the high-altitude device can be reduced, and the ground device does not need to adjust the beam direction in real time. This reduces power consumption of the ground device, and improves an antenna gain of the ground device.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. An air-ground communication control method, comprising:

receiving, by a ground device, location information of a high-altitude device sent by the high-altitude device, wherein the ground device is located in a ground network, the high-altitude device is located in an aerial network, and a beam of the high-altitude device covers the ground device;

determining a beam direction from the ground device to the high-altitude device and beam width information according to location information of the ground device and the location information of the high-altitude device; and sending the beam width information to the high-altitude device in the beam direction, wherein the beam width information is used to adjust an interval of sending the location information of the high-altitude device.

2. The communication control method according to claim 1, wherein before determining a beam direction from the ground device to the high-altitude device and beam width information, the method further comprises:

obtaining, by the ground device, a maximum moving rate of the high-altitude device;

calculating a boundary of a location range of the high-altitude device according to the maximum moving rate; and controlling the high-altitude device to move within the boundary of the location range.

3. The communication control method according to claim 2, wherein obtaining a maximum moving rate of the high-altitude device comprises:

obtaining location information of the high-altitude device at a plurality of pairs of different moments within one or more flight cycles of the high-altitude device;

calculating an average rate in a time difference between the different moments of each pair according to the location information at the different moments of the pair; and designating one of the average rates associated with the pairs of different moments having a largest average rate as the maximum moving rate.

4. The communication control method according to claim 3, wherein the calculating a boundary of a location range of the high-altitude device according to the maximum moving rate comprises:

calculating the boundary of the location range of the high-altitude device according to the maximum moving rate, a maximum frequency offset allowed for a wireless link between the ground device and the high-altitude device, and a beam wavelength.

5. The communication control method according to claim 1, wherein the determining a beam direction to the high-altitude device and beam width information according to location information of the ground device and the location information of the high-altitude device comprises:

calculating coordinates of a central location of a moving track of the high-altitude device according to the location information of the high-altitude device; and calculating the beam direction and the beam width information according to the coordinates of the central location of the moving track and the location information of the ground device.

6. The communication control method according to claim 5, wherein the calculating the beam direction and the beam width information according to the coordinates of the central location of the moving track and the location information of the ground device comprises:

calculating a distance between the ground device and the central location of the moving track according to the coordinates of the central location of the moving track and the location information of the ground device;

calculating the beam direction according to the distance between the ground device and the central location of the moving track, the coordinates of the central location of the moving track, and the location information of the ground device;

calculating a radius of the moving track according to the location information of the high-altitude device; and calculating the beam width information according to the distance between the ground device and the central location of the moving track, a first preset value, the coordinates of the central location of the moving track, and the location information of the ground device, wherein the first preset value is greater than or equal to the radius of the moving track.

7. The communication control method according to claim 1, wherein the determining a beam direction and beam width information according to location information of the ground device and the location information of the high-altitude device comprises:

calculating a radius of the moving track according to the location information of the high-altitude device;

calculating a distance between the ground device and the high-altitude device according to the location information of the ground device and the location information of the high-altitude device;

calculating the beam direction according to the distance between the ground device and the high-altitude device, the location information of the high-altitude device, and the location information of the ground device; and calculating the beam width information according to the distance between the ground device and the high-altitude device, a second preset value, the location information of the high-altitude device, and the location information of the ground device, wherein the second preset value is greater than zero and less than or equal to the radius of the moving track.

8. The communication control method according to claim 1, wherein the ground device is a baseband unit (BBU), a base station, or a cloud baseband processing unit, and the cloud baseband processing unit comprises a plurality of BBUs.

9. The communication control method according to claim 1, wherein the high-altitude device is a remote radio unit (RRU), a repeater, or an antenna.

10. The communication control method according to claim 1, wherein when the ground device is a BBU or a cloud baseband processing unit, the cloud baseband processing unit comprises a plurality of BBUs, and the high-altitude device is an RRU, the method further comprises:

measuring, by the ground device, quality of a wireless fronthaul link, wherein the wireless fronthaul link is a wireless communication link between the ground device and the high-altitude device;

determining, according to the quality of the link, whether transmission interface switching needs to be performed on the wireless fronthaul link; and sending switching control information to the high-altitude device when it is determined that switching needs to be performed, to control transmission interface switching to be performed on the wireless fronthaul link.

11. The communication control method according to claim 10, wherein the determining, according to the quality of the link, whether switching needs to be performed on the wireless fronthaul link comprises:

comparing, by the ground device, the quality of the wireless fronthaul link with a threshold; and if the quality of the wireless fronthaul link is greater than the threshold, determining to perform wireless fronthaul communication with the high-altitude device by using a wireless optical transmission interface; or if the quality of the wireless fronthaul link is less than the threshold, determining to perform wireless fronthaul communication with the high-altitude device by using a radio transmission interface.

12. The communication control method according to claim 11, wherein the sending switching control information to the high-altitude device when it is determined that switching needs to be performed, to control switching to be performed on the wireless fronthaul link comprises:

when determining to perform wireless fronthaul communication with the high-altitude device by using the wireless optical transmission interface, sending, by the ground device, the switching control information to the high-altitude device, to instruct the high-altitude device to perform wireless fronthaul communication by using the wireless optical transmission interface; or when determining to perform wireless fronthaul communication with the high-altitude device by using the radio transmission interface, sending, by the ground device, the switching control information to the high-altitude device, to instruct the high-altitude device to perform wireless fronthaul communication by using the radio transmission interface.

13. An air-ground communication control method, comprising:
- periodically obtaining, by a high-altitude device, location information of the high-altitude device;
- sending the location information of the high-altitude device to a ground device, wherein the ground device is located in a ground network, the high-altitude device is located in an aerial network, and a beam of the high-altitude device covers the ground device;
- receiving beam width information sent by the ground device, wherein the beam width information is calculated by the ground device according to the received location information of the high-altitude device and location information of the ground device; and
- adjusting, according to the beam width information, an interval of sending the location information of the high-altitude device, wherein a larger beam width indicated in the beam width information leads to a longer interval of sending the location information of the high-altitude device.

14. The communication control method according to claim 13, wherein before sending the location information of the high-altitude device to a ground device, the method further comprises:
- determining a beam direction from the high-altitude device to the ground device and beam width information according to the location information of the high-altitude device and location information of the ground device, wherein the location information of the ground device is preconfigured for the high-altitude device, and a beam width indicated in the beam width information covers at least the ground device; and
- wherein sending the location information of the high-altitude device to a ground device comprises:
  - sending the location information of the high-altitude device to the ground device in the beam direction.

15. The communication control method according to claim 13, wherein the determining a beam direction to the ground device and beam width information according to location information of the ground device and the location information of the high-altitude device comprises:
- calculating coordinates of a central location of a moving track of the high-altitude device according to the location information of the high-altitude device; and
- calculating the beam direction and the beam width information according to the coordinates of the central location of the moving track and the location information of the ground device.

16. The communication control method according to claim 15, wherein the calculating the beam direction and the beam width information according to the coordinates of the central location of the moving track and the location information of the ground device comprises:
- calculating a distance between the ground device and the central location of the moving track according to the coordinates of the central location of the moving track and the location information of the ground device;
- calculating the beam direction according to the distance between the ground device and the central location of the moving track, the coordinates of the central location of the moving track, and the location information of the ground device;
- calculating a radius of the moving track according to the location information of the high-altitude device; and
- calculating the beam width information according to the distance between the ground device and the central location of the moving track, a first preset value, the coordinates of the central location of the moving track, and the location information of the ground device, wherein the first preset value is greater than or equal to the radius of the moving track.

17. The communication control method according to claim 14, wherein the determining a beam direction and beam width information according to location information of the ground device and the location information of the high-altitude device comprises:
- calculating a radius of the moving track according to the location information of the high-altitude device;
- calculating a distance between the ground device and the high-altitude device according to the location information of the ground device and the location information of the high-altitude device;
- calculating the beam direction according to the distance between the ground device and the high-altitude device, the location information of the high-altitude device, and the location information of the ground device; and
- calculating the beam width information according to the distance between the ground device and the high-altitude device, a second preset value, the location information of the high-altitude device, and the location information of the ground device, wherein the second preset value is greater than zero and less than or equal to the radius of the moving track.

18. The communication control method according to claim 13, wherein when the ground device is a baseband unit (BBU) or a cloud baseband processing unit, the cloud baseband processing unit comprises a plurality of BBUs, and the high-altitude device is a remote radio unit (RRU), the method further comprises:
- receiving a switching control command from the ground device, and switching to, according to information carried in the control command, a corresponding interface to perform wireless fronthaul communication.

19. A ground device to control air-ground communication, the ground device comprising:
- a receiving module, configured to receive location information of a high-altitude device sent by the high-altitude device, wherein the ground device is located in a ground network, the high-altitude device is located in an aerial network, and a beam of the high-altitude device covers the ground device;
- a control module, configured to determine a beam direction from the ground device to the high-altitude device and beam width information according to location information of the ground device and the location information that is received by the receiving module; and
- a sending module, configured to send the beam width information to the high-altitude device in the beam direction determined by the control module, wherein the beam width information is used to adjust an interval of sending the location information of the high-altitude device.

20. The ground device according to claim 19, further comprising:
- a rate obtaining module, configured to obtain a maximum moving rate of the high-altitude device;
- a calculation module, configured to calculate a boundary of a location range of the high-altitude device according to the maximum moving rate obtained by the rate obtaining module; and a movement control module, configured to control the high-altitude device to move within the boundary that is of the location range and that is calculated by the calculation module.

21. The ground device according to claim 20, wherein the rate obtaining module comprises:

a calculation unit, configured to calculate an average rate in a time difference between two different moments of each of a plurality of pairs of different moments within one or more flight cycles of the high-altitude device according to location information at the different moments of the pair that is obtained by the receiving module; and a rate determining unit, configured to designate one of the average rates associated with the pairs of different moments having a highest average rate as the maximum moving rate.

22. The ground device according to claim 20, wherein the calculation module is configured to:

calculate the boundary of the location range of the high-altitude device according to the maximum moving rate, a maximum frequency offset allowed for a wireless link between the ground device and the high-altitude device, and a beam wavelength.

23. The ground device according to claim 19, wherein the control module comprises:

a track center coordinates calculation unit, configured to calculate coordinates of a central location of a moving track of the high-altitude device according to the location information of the high-altitude device; and a direction and width calculation unit, configured to calculate the beam direction and the beam width information according to the coordinates of the central location of the moving track that are calculated by the track center coordinates calculation unit and the location information of the ground device.

24. The ground device according to claim 23, wherein the direction and width calculation unit comprises:

a distance calculation subunit, configured to calculate a distance between the ground device and the central location of the moving track according to the coordinates of the central location of the moving track that are calculated by the track center coordinates calculation unit and the location information of the ground device;

a beam direction calculation subunit, configured to calculate the beam direction according to the distance calculated by the distance calculation subunit, the coordinates of the central location of the moving track that are calculated by the track center coordinates calculation unit, and the location information of the ground device;

a radius calculation subunit, configured to calculate a radius of the moving track according to the location information of the high-altitude device; and a beam width information calculation subunit, configured to calculate the beam width information according to the distance calculated by the distance calculation subunit, a first preset value, the coordinates of the central location of the moving track that are calculated by the track center coordinates calculation unit, and the location information of the ground device, wherein the first preset value is greater than or equal to the radius of the moving track.

25. The ground device according to claim 19, wherein the control module comprises:

a radius calculation module, configured to calculate a radius of the moving track according to the location information of the high-altitude device;

a distance calculation module, configured to calculate a distance between the ground device and the high-altitude device according to the location information of the ground device and the location information of the high-altitude device;

a beam direction calculation module, configured to calculate the beam direction according to the distance that is between the ground device and the high-altitude device and that is calculated by the distance calculation module, the location information of the high-altitude device, and the location information of the ground device; and a beam width information calculation module, configured to calculate the beam width information according to the distance that is between the ground device and the high-altitude device and that is calculated by the distance calculation module, a second preset value, the location information of the high-altitude device, and the location information of the ground device, wherein the second preset value is greater than zero and less than or equal to the radius of the moving track.

26. The ground device according to claim 19, wherein the ground device is a baseband unit (BBU), a base station, or a cloud baseband processing unit, the cloud baseband processing unit comprises a plurality of BBUs, and the high-altitude device is a remote radio unit (RRU), a repeater, or an antenna.

27. The ground device according to claim 19, wherein when the ground device is a BBU or a cloud baseband processing unit, and the cloud baseband processing unit comprises a plurality of BBUs, the platform further comprises:

a measurement module, configured to measure quality of a wireless fronthaul link, wherein the wireless fronthaul link is a wireless communication link between the ground device and the high-altitude device;

a judging module, configured to determine, according to the quality of the link measured by the measurement module, whether transmission interface switching needs to be performed on the wireless fronthaul link; and a switching indication module, configured to send switching control information to the high-altitude device when it is determined that switching needs to be performed, to control transmission interface switching to be performed on the wireless fronthaul link.

28. The ground device according to claim 27, wherein the judging module comprises:

a comparison unit, configured to compare the quality of the wireless fronthaul link measured by the measurement module with a threshold; and a judging unit, configured to: if a comparison result of the comparison unit is that the quality of the wireless fronthaul link is greater than the threshold, determine to perform wireless fronthaul communication with the high-altitude device by using a wireless optical transmission interface; or if a comparison result of the comparison unit is that the quality of the wireless fronthaul link is less than the threshold, determine to perform wireless fronthaul communication with the high-altitude device by using a radio transmission interface.

29. A high-altitude device to control air-ground communication, the high-altitude device comprising:
an information obtaining module, configured to periodically obtain location information of the high-altitude device;
a sending module, configured to send the location information of the high-altitude device to a ground device, wherein the ground device is located in a ground network, the high-altitude device is located in an aerial network, and a beam of the high-altitude device covers the ground device;
a receiving module, configured to receive beam width information sent by the ground device, wherein the beam width information is calculated by the ground device according to the location information and location information of the ground device; and
an adjusting module, configured to adjust, according to the beam width information received by the receiving module, an interval of sending the location information of the high-altitude device, wherein a larger beam width indicated in the beam width information leads to a longer interval of sending the location information of the high-altitude device.

30. The high-altitude device according to claim 29, further comprising:
a beam direction control module, configured to determine a beam direction from the high-altitude device to the ground device and beam width information according to the location information of the high-altitude device obtained by the information obtaining module and the location information of the ground device, wherein the location information of the ground device is preconfigured for the high-altitude device; and
wherein the sending module is configured to:
send the location information of the high-altitude device to the ground device in the beam direction determined by the beam direction control module.

31. The high-altitude device according to claim 29, wherein the beam direction control module comprises:
a track center coordinates calculation unit, configured to calculate coordinates of a central location of a moving track of the high-altitude device according to the location information of the high-altitude device; and
a direction and width calculation unit, configured to calculate the beam direction and the beam width information according to the coordinates of the central location of the moving track that are calculated by the track calculation unit and the location information of the ground device.

32. The high-altitude device according to claim 31, wherein the direction and width calculation unit comprises:
a distance calculation subunit, configured to calculate a distance between the ground device and the central location of the moving track according to the coordinates of the central location of the moving track that are calculated by the track center coordinates calculation unit and the location information of the ground device;
a beam direction calculation subunit, configured to calculate the beam direction according to the distance calculated by the distance calculation subunit, the coordinates of the central location of the moving track that are calculated by the track center coordinates calculation unit, and the location information of the ground device;
a radius calculation subunit, configured to calculate a radius of the moving track according to the location information of the high-altitude device; and
a beam width information calculation subunit, configured to calculate the beam width information according to the distance calculated by the distance calculation subunit, a first preset value, the coordinates of the central location of the moving track that are calculated by the track center coordinates calculation unit, and the location information of the ground device, wherein the first preset value is greater than or equal to the radius of the moving track.

33. The high-altitude device according to claim 29, wherein the beam direction control module comprises:
a radius calculation module, configured to calculate a radius of the moving track according to the location information of the high-altitude device;
a distance calculation module, configured to calculate a distance between the ground device and the high-altitude device according to the location information of the ground device and the location information of the high-altitude device;
a beam direction calculation module, configured to calculate the beam direction according to the distance that is between the ground device and the high-altitude device and that is calculated by the distance calculation module, the location information of the high-altitude device, and the location information of the ground device; and
a beam width information calculation module, configured to calculate the beam width information according to the distance that is between the ground device and the high-altitude device and that is calculated by the distance calculation module, a second preset value, the location information of the high-altitude device, and the location information of the ground device, wherein the second preset value is greater than zero and less than or equal to the radius of the moving track.

34. The high-altitude device according to claim 29, wherein when the ground device is a baseband unit (BBU) or a cloud baseband processing unit, the cloud baseband processing unit comprises a plurality of BBUs, and the high-altitude device is a remote radio unit (RRU), the receiving module is further configured to receive a switching control command from the ground device, and the high-altitude device further comprises:
a switching module, configured to: after the receiving module receives the switching control command from the ground device, switch to, according to information carried in the control command, a corresponding interface to perform wireless fronthaul communication.

35. The high-altitude device according to claim 29, wherein the high-altitude device is one of a plurality of high-altitude front-end platform devices and the ground device is a ground processing platform device, wherein the high-altitude front-end platform devices and the ground processing platform device form a star topology, and wherein the plurality of high-altitude front-end platform devices separately perform wireless communication with the ground processing platform device.

36. The high-altitude device according to claim 29, wherein the high-altitude device is one of a plurality of high-altitude front-end platform devices and the ground processing platform device is one of a plurality of group processing platform devices, and wherein each high-altitude front-end platform device uniquely corresponds to one of the ground processing platform devices for wireless communication.

37. The high-altitude device according to claim 29, wherein the high-altitude device is a first one of a plurality of high-altitude front-end platform devices that form a chain topology, wherein the group device is a ground processing platform device, wherein first high-altitude front-end platform device performs wireless communication with the ground processing platform device, while remaining high-altitude front-end platform devices perform wireless communication with the first high-altitude front-end platform device by using a trunk link.

38. The high-altitude device according to claim 29, wherein the high-altitude device is one of a plurality of high-altitude front-end platform devices and the ground device is one of two ground processing platform devices, wherein the high-altitude front-end platform devices and the ground processing platform devices form a ring topology, wherein two of the high-altitude front-end platform devices separately perform wireless communication with the two ground processing platform devices, while remaining high-altitude front-end platform devices perform wireless communication with one of the two high-altitude front-end platform devices by using a trunk link.

39. The high-altitude device according to claim 29, wherein the ground device is a baseband unit (BBU), a base station, or a cloud baseband processing unit, and wherein the cloud baseband processing unit comprises a plurality of BBUs.

40. The high-altitude device according to claim 29, wherein the high-altitude device is a remote radio unit (RRU), a repeater, or an antenna.

* * * * *